United States Patent
Shiiki et al.

(10) Patent No.: US 7,871,542 B2
(45) Date of Patent: *Jan. 18, 2011

(54) PLASMA DISPLAY DEVICE, LUMINESCENT DEVICE AND IMAGE AND INFORMATION DISPLAY SYSTEM USING THE SAME

(75) Inventors: Masatoshi Shiiki, Musashimurayama (JP); Teruki Suzuki, Funabashi (JP); Choichiro Okazaki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 981 days.

This patent is subject to a terminal disclaimer.

(21) Appl. No.: 11/526,620

(22) Filed: Sep. 26, 2006

(65) Prior Publication Data

US 2007/0018912 A1    Jan. 25, 2007

Related U.S. Application Data

(63) Continuation of application No. 10/283,140, filed on Oct. 30, 2002, now Pat. No. 7,138,965.

(30) Foreign Application Priority Data

| Oct. 30, 2001 | (JP) | 2001-331855 |
| Oct. 31, 2001 | (JP) | 2001-333675 |
| Oct. 31, 2001 | (JP) | 2001-333681 |

(51) Int. Cl.
    *H01J 11/00*    (2006.01)

(52) U.S. Cl. .............. 252/301.4 F; 313/487; 313/584; 313/582

(58) Field of Classification Search ........... 252/301.4 F; 313/487, 584, 582
    See application file for complete search history.

(56) References Cited

U.S. PATENT DOCUMENTS

| 5,951,915 | A | 9/1999 | Hase et al. |
| 6,284,156 | B1 | 9/2001 | Uehara et al. |
| 6,423,248 | B1 | 7/2002 | Rao et al. |
| 6,462,473 | B1 | 10/2002 | Juestel et al. |
| 6,573,654 | B2 | 6/2003 | Juestel et al. |
| 6,590,333 | B1 | 7/2003 | Suzuki et al. |
| 6,617,788 | B2 | 9/2003 | Shiiki et al. |
| 6,794,821 | B2 | 9/2004 | Juestel et al. |
| 7,138,965 | B2 * | 11/2006 | Shiiki et al. .......... 345/60 |
| 2002/0041145 | A1 | 4/2002 | Yokosawa et al. |
| 2002/0191008 | A1 | 12/2002 | Naka et al. |

FOREIGN PATENT DOCUMENTS

| JP | 56-136875 | 10/1981 |
| JP | 64-006087 | 1/1989 |
| JP | 10-172459 | 6/1998 |

(Continued)

*Primary Examiner*—C. Melissa Koslow
(74) *Attorney, Agent, or Firm*—Antonelli, Terry, Stout & Kraus, LLP.

(57) ABSTRACT

A plasma display device comprising phosphor layer wherein the phosphor layer comprises blue-emission divalent europium activated alkaline earth silicate phosphor which is represented by the following compositional formula $(Ae)_{3-x}(Ae')Si_2O_8:Eu_x$, wherein x satisfies $0.01 \leq x \leq 0.1$, Ae is at least one alkaline earth element selected from the group consisting of Sr, Ca, and Ba, and Ae' is at least one element selected from the group consisting of Zn or (Zn plus Mg).

16 Claims, 10 Drawing Sheets

FOREIGN PATENT DOCUMENTS

| | | |
|---|---|---|
| JP | 11-297221 | 1/1999 |
| JP | 11-282414 | 10/1999 |
| JP | 2000-026854 | 1/2000 |
| JP | 2001-135239 | 5/2001 |
| JP | 2001-234165 | 8/2001 |

* cited by examiner

PLASMA DISPLAY DEVICE, LUMINESCENT DEVICE AND IMAGE AND INFORMATION DISPLAY SYSTEM USING THE SAME

This application is a continuation of application Ser. No. 10/283,140, filed Oct. 30, 2002, now U.S. Pat. No. 7,138,965, and the contents of all of which are incorporated herein by reference.

BACKGROUND OF THE INVENTION

The present invention relates to a plasma display device used in a broadcast receiver or for image display, to a luminescent device excited by a rare gas resonance UV beam or a low-speed electron beam, and to an image display system using the display device and the luminescent device.

In recent years, a plasma display device using a plasma display panel (hereinafter simply referred to as PDP) has been mass-produced as a flat-panel display device used in a broadcast receiver or a computer terminal or for image (video) display.

The plasma display device performs color display by causing a phosphor disposed in an extremely small discharge space containing a rare gas in the PDP to emit light by using, as an excitation source, a short-wavelength UV beam (which has a resonance line at 147 nm or 172 nm if xenon is used as the rare gas) generated in the negative glow region of the discharge space.

In the PDP of the plasma display device, the resonance line of a rare gas shorter in wavelength than the resonance line of mercury vapor, which is at 253.7 nm, or the like is used as an excitation source for the phosphor. The short wavelength limit thereof is the wavelength of the resonance line of helium, which is 58.4 nm.

An exemplary structure of the gas discharge cell is as shown in "Technology & Materials of Color Plasma Display Panel" published by CMC Publishing Co. Ltd. A representative structure thereof is shown in FIG. 9. FIG. 9 is an exploded perspective view showing the structure of a typical surface-discharge color plasma display device (PDP). The PDP shown in FIG. 9 is a reflective PDP obtained by bonding a front glass substrate 10 and a rear glass substrate 20, each composed of a glass substrate, to each other in integral relation and forming phosphor layers 24, 25, and 26 in red (R), green (G), and blue (B) colors, respectively, on the rear glass substrate 20.

A pair of sustaining discharge electrodes 11 and 12 are formed in parallel to have a specified distance therebetween on the surface of the front glass substrate 10 opposing the rear glass substrate 20. The pair of sustaining discharge electrodes 11 and 12 are composed of transparent electrodes. Opaque bus electrodes 13 and 14 for compensating for the conductivity of the transparent electrodes are provided in superimposing relation on the sustaining discharge electrodes 11 and 12.

These electrodes 11 to 14 are covered with a dielectric (such as lead glass) layer 15 for AC driving. The dielectric layer 15 is provided with a protection film 16 made of a magnesium oxide (MgO).

Magnesium oxide (MgO), which is high in resistivity for sputtering damage and in secondary electron yield, functions to protect the dielectric layer 15 and lower a discharge initiation voltage.

The rear glass substrate 20 has, on the surface thereof opposing the front glass substrate 10, a group of electrodes consisting of address electrodes 21 which are orthogonal to the pair of sustaining discharge electrodes 11 and 12 on the front glass substrate 10. The address electrodes 21 are covered with a dielectric layer 22. Barrier ribs 23 for separating the address electrodes 21 from each other are provided on the dielectric layer 22 to prevent the expansion of a discharge (define a region for the discharge). The barrier ribs 23 are composed of a low-melting glass and formed with equal spacings to have the same heights and identically configured sidewalls.

The phosphor layers 24, 25, and 26 are coated successively in stripes in such a manner as to cover the groove surfaces between the barrier ribs 23. The formation of the phosphor layers 24, 25, and 26 is performed by coating, on the rear glass substrate 20 having the address electrodes 21, the dielectric layers 22, and the barrier ribs 23 formed thereon, phosphor pastes prepared by mixing phosphor particles forming the phosphor layers 24, 25, and 26 and vehicles by a method such as screen printing and then removing a volatile component therefrom by baking.

A discharge gas (a gas mixture of, e.g., helium, neon, xenon, and the like) is sealed in the discharge space between the front glass substrate 10 and the rear glass substrate 20, though it is not depicted in FIG. 9.

In the PDP, a discharge cell (a unit light-emitting region or a discharge spot) is selected by either one of the sustaining discharge electrodes 11 and 12, e.g., the sustaining discharge electrode 12 and the address electrode 21 and a gas discharge is caused repeatedly in the selected discharge cell through a sustained discharge between the sustaining discharge electrodes 11 and 12.

A vacuum UV beam resulting from the gas discharge excites the phosphor layers in the region so that visible emission is obtained. Color display is obtained by combining emission of each of unit cells having the red, green, and blue phosphor layers 24, 25, and 26 corresponding to the three primary colors.

Color PDPs which have been improved increasingly in performance year after year are replacing direct-view cathode ray tube color televisions. For the PDPs to be widespread as major large-scale televisions for home use as television broadcast receivers, they should have a higher moving-picture quality and a longer lifetime.

SUMMARY OF THE INVENTION

It is therefore an object of the present invention to provide red and green phosphor layers capable of implementing a higher-performance PDP with an improved moving-picture quality and a longer lifetime.

These and other objects and novel features of the present invention will be apparent from the description and accompanying drawings of the present specification.

The moving-image quality of a plasma display device is affected by the decay time of visible light from each of phosphors emitting light in red, green, and blue colors. In the case where the driving frequency of the display is 60 Hz, if the decay time becomes 16.6 ms or more, the tailing of emitted light is still observed in the subsequent cycle, resulting in disturbance in a display image. To prevent this, the decay times (1/10 decay time) of the phosphors should be minimized. In practical applications, however, a moving image can be displayed with a considerably high quality if the decay times are reduced to about 8 ms or less. If the decay times can further be reduced to 6 ms or less, a moving image can be displayed in most cases with a high quality. Various red phosphors and green phosphors were therefore prototyped and the decay times of the phosphors in a PDP were evaluated. It is to be noted that the decay time of a blue phosphor used in a current PDP need not particularly be shortened since it is extremely short (1 ms or less).

As a result, it was found that a green phosphor was preferably composed of a $Zn_2SiO_4$:Mn phosphor having a Mn/Zn composition ratio of 0.05 or more. It was also found that a green phosphor preferably had a composition obtained by mixing the $Zn_2SiO_4$:Mn with one or more selected from the group consisting of $(Y,Gd,Sc)_2SiO_5$:Tb, $(Y,Gd)_3(Al,Ga)_5O_{12}$:Tb, $(Y,Gd)_3(Al,Ga)_5O_{12}$:Ce, $(Y,Gd)B_3O_6$:Tb, and $YBO_3$:Tb phosphors.

On the other hand, it was found that a red phosphor preferably had a composition obtained by mixing $(Y,Gd)BO_3$:Eu with either one of $(Y_2O_3)$:Eu and $(Y,Gd)(P,V)O_4$:Eu.

Although the present inventors developed previously a divalent europium-activated alkaline earth silicate phosphor as a blue phosphor for an electron beam (Japanese Laid-Open Patent Publication Nos. SHO 64-6087 and HEI 01-167394), the evaluation thereof with the use of a vacuum UV beam and a low-speed electron beam has not been performed yet. The present invention has been achieved by finding, for the phosphor in question, a composition having an excellent color tone and a high luminous efficiency under excitation caused by a vacuum UV beam and a low-speed electron beam. The phosphor according to the present invention is represented by the following compositional formula:

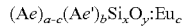

$(Ae)_{a-c}(Ae')_b Si_x O_y$:$Eu_c$ wherein Ae is at least one alkaline earth element selected from Sr, Ca, and Ba; Ae' is at least one element selected from the group consisting of Mg and Zn; a is 3; b is 1; c satisfies $0.01 \leq c \leq 0.3$; x is 2; and y is 8. One or more phosphor compositions selected from those represented by the foregoing compositional formula were found to be suitable.

The foregoing object is attainable by applying the foregoing red, green, and blue phosphors to respective phosphor layers providing red and green emission in a PDP.

DETAILED DESCRIPTION OF THE PREFERRED EMBODIMENTS

Figure 1:
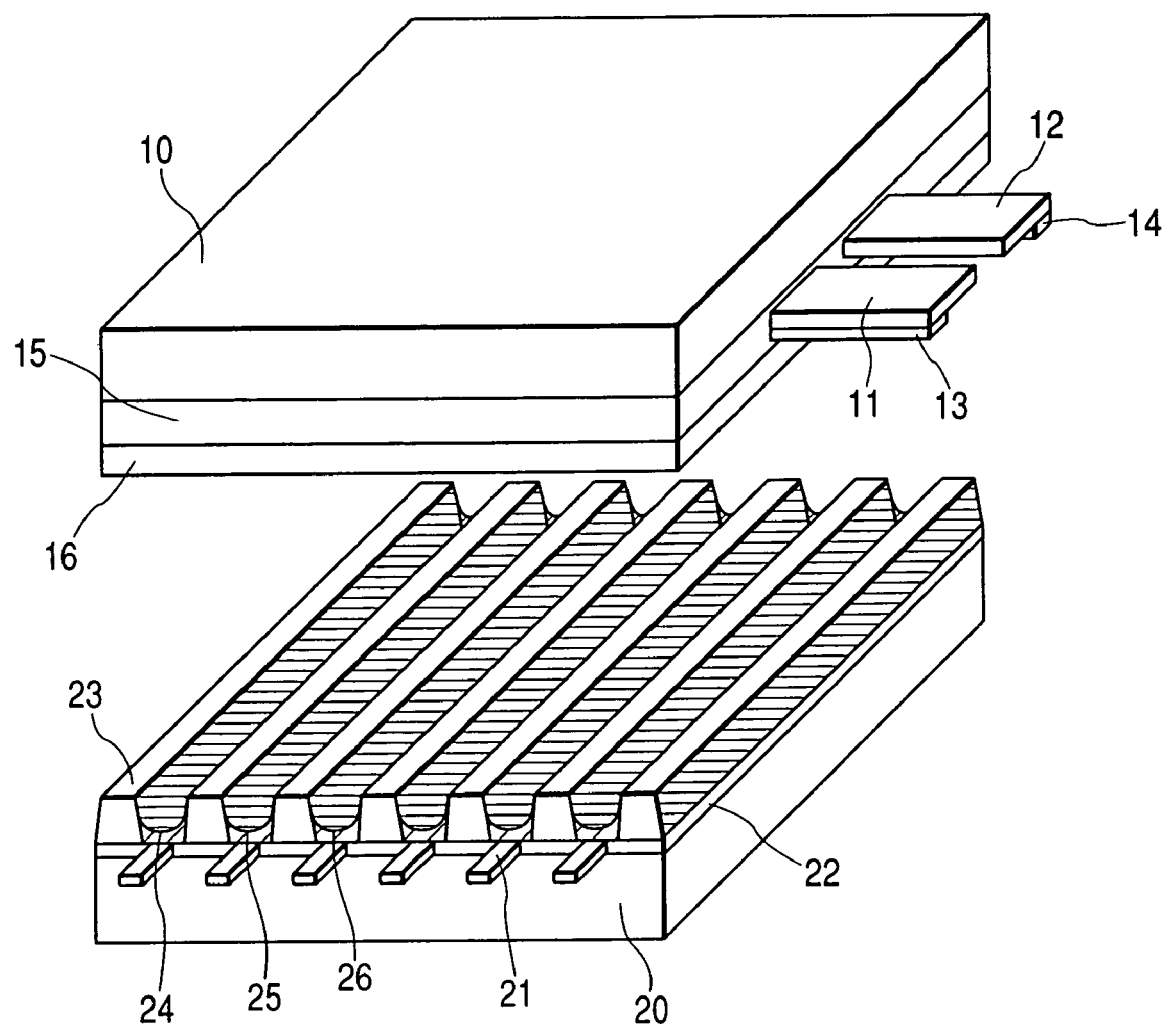
FIG. 1 is an exploded perspective view showing a structure of a plasma display panel in a plasma display device according to EMBODIMENT 1 of the present invention.

Referring now to the drawings, the embodiments of the present invention will be described in detail.

EMBODIMENT 1

FIG. 1 is an exploded perspective view showing a structure of a PDP in a plasma display device according to EMBODIMENT 1 of the present invention.

Figure 2:
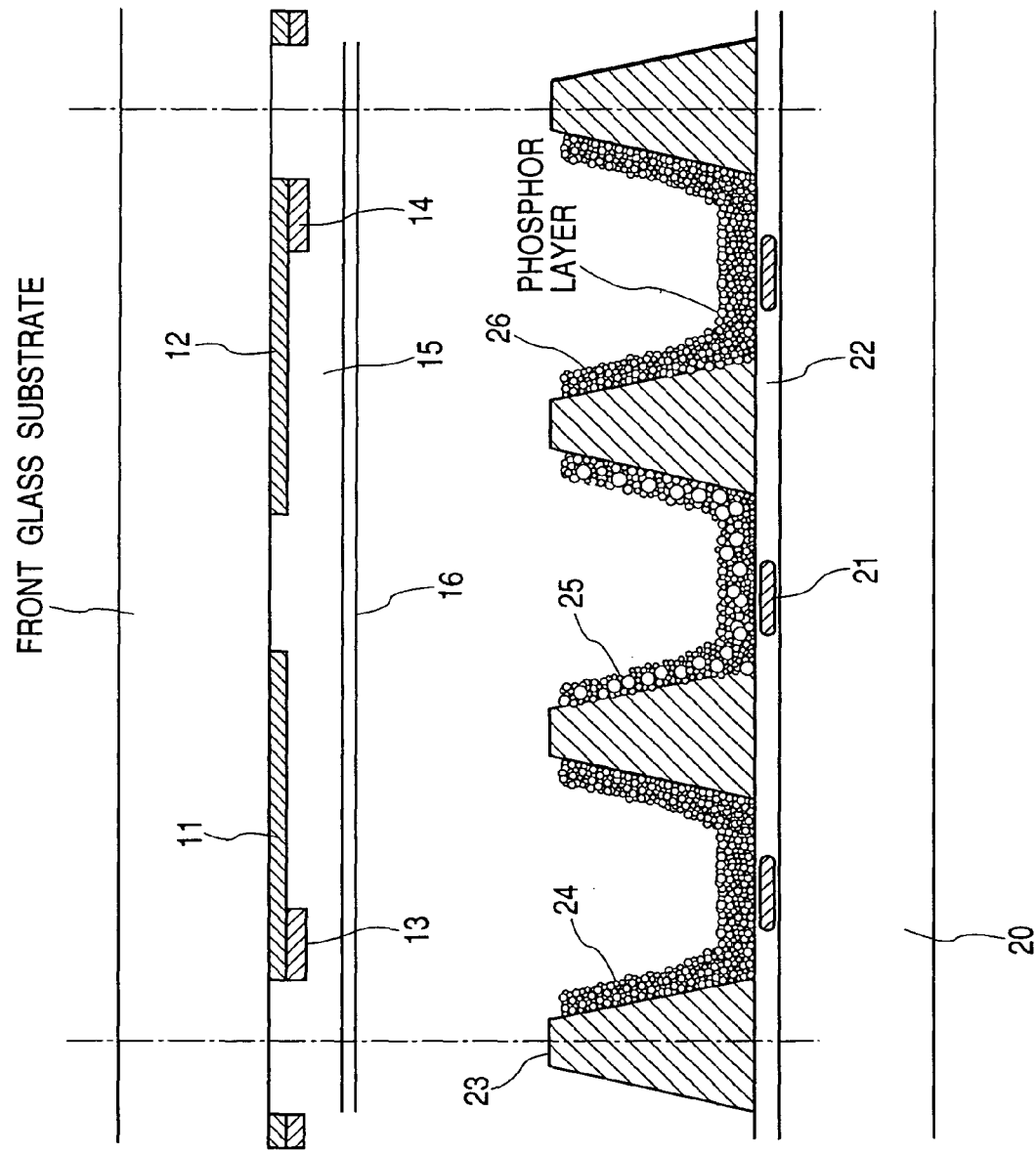
FIG. 2 is a cross-sectional view showing a structure corresponding to one pixel in the plasma display panel according to EMBODIMENT 1.

FIG. 2 is a cross-sectional view showing a structure corresponding to one pixel in the PDP according to the present embodiment. Detailed description of the PDP of the plasma display device according to the present embodiment will be omitted since the structure thereof is substantially the same as that of the aforementioned PDP shown in FIG. 9 except that a phosphor layer 24 is filled with a red phosphor prepared by mixing a $(Y,Gd)BO_3$:Eu phosphor material with a $Y_2O_3$:Eu phosphor, which is a characteristic of the present invention. The phosphor layer 25 is filled with a green phosphor which is a $Zn_2SiO_4$:Eu phosphor used conventionally and exhibiting a 1/10 decay characteristic of 6 ms. FIG. 2 shows the front glass substrate 10 of the PDP that has been rotated by ±90°.

In a PDP such as the surface-discharge color PDP according to the present embodiment, a discharge is induced by, e.g., applying a negative voltage to a sustaining discharge electrode 12 (generally termed a scan electrode) and applying a positive voltage (which is positive relative to the voltage applied to the sustaining discharge electrode 12) to an address electrode 21 and to a sustaining discharge electrode 11, whereby a wall charge which helps to initiate a discharge between the sustaining discharge electrodes 11 and 12 is formed (which is termed writing). If an appropriate inverse voltage is applied between the sustaining discharge electrodes 11 and 12 in this state, a discharge occurs in a discharge space between the two electrodes via a dielectric layer 15 (and protection layer 16). After the discharge is completed, if the voltage applied to the sustaining discharge electrodes 11 and 12 is inverted, a discharge newly occurs. By repeating the foregoing procedure, a continuous discharge occurs (which is termed a sustained discharge or a display discharge).

In the PDP according to the present embodiment, the address electrodes 21 composed of silver or the like and a dielectric layer 22 composed of a glass-based material are formed on a rear glass electrode 20 and then a barrier rib material similarly composed of a glass-based material is thin-film printed thereon so that barrier ribs 23 are formed by blast removal using a blast mask. Subsequently, red, green, and blue phosphor layers (24, 25, and 26) are formed successively in stripes on the barrier ribs 23 in such a manner as to cover the groove surfaces between the corresponding barrier ribs 23.

The phosphor layers (24, 25, and 26) correspond to red, green, and blue colors. The phosphor layers are formed by preparing 40 weight ratio of red phosphor particles (60 weight ratio of vehicle), 35 weight ratio of green phosphor particles (65 weight ratio of vehicle), and 30 weight ratio of blue phosphor particles (70 weight ratio of vehicle), individually mixing the phosphor particles with the vehicles to provide phosphor pastes, coating the phosphor pastes by screen printing, evaporating a volatile component from each of the phosphor pastes and burn-removing an organic material therefrom in a paste dry and baking process. The phosphor layers used in the present embodiment are composed of phosphor particles having a median diameter of 3 μm.

The individual materials of the phosphors are as follows: the material of the red phosphor is a 1:1 mixture of the (Y,Gd)BO$_3$:Eu phosphor and the Y$_2$O$_3$:Eu phosphor; the material of the green phosphor material is the Zn$_2$SiO$_4$:Mn phosphor having a Mn/Zn composition ratio adjusted to 0.07 to achieve a 1/10 decay time of 6 ms; and the material of the blue phosphor is a BaMgAl$_{10}$O$_{14}$:Eu phosphor.

Next, the front glass substrate 10 formed with the sustaining discharge electrodes (11, 12), the bus electrodes (13, 14), the dielectric layer 15, and the protection layer 16 and the rear glass substrate 20 are frit-sealed. After the panel is evacuated, a discharge gas is injected therein and sealed. The PDP according to the present embodiment has a 42" wide-screen size and the number of pixels (VGA) (852×480). The pitch of one pixel therein is 490 μm×1080 μm.

Next, the Mn/Zn composition ratio of the Zn$_2$SiO$_4$:Mn phosphor was varied from 0.01 to 0.1 and plasma display devices were fabricated in the present embodiment by using the same red-emission and blue-emission phosphor materials and filling the green-emission phosphor materials having the individual Mn/Zn composition ratios in the green phosphor layers 25. The moving-image qualities and the decay times of the PDP panels were examined.

The respective 1/10 decay times of the green phosphors having the Mn/Zn composition ratios of 0.01, 0.03, 0.05, 0.07, 0.09, and 0.1 were 12 ms, 10 ms, 8 ms, 6 ms, 4 ms, and 3 ms. In the Zn$_2$SiO$_4$:Mn phosphors exhibiting a decay characteristic of 4 ms or less and having a Mn/Zn composition ratio of 0.09 or more, however, significant reductions in brightness, lifetime, and performance were observed.

The red phosphor used in the present embodiment was a 1:1 mixture of the (Y,Gd)BO$_3$:Eu phosphor and the (Y$_2$O$_3$):Eu phosphor and the 1/10 decay time thereof was found to be about 6 ms. As a result of subjective evaluation during moving-image display, it was found that the combination with the green phosphor, which also had a decay time of 6 ms, gave the best impression and the combinations with the green phosphors, which had decay times of 8 ms and 4 ms, provided the second best image qualities.

COMPARATIVE EXAMPLE 1

In a comparative example, a plasma display device was fabricated by using a red phosphor composed only of the (Y,Gd)BO$_3$:Eu phosphor and using a green phosphor composed of the Zn$_2$SiO$_4$:Mn phosphor having a Mn/Zn composition ratio of 0.01. The moving-image qualities of the plasma display devices and the decay times of the PDP panels were compared between EMBODIMENT 1 and COMPARATIVE EXAMPLE 1.

The 1/10 decay time of the plasma display device fabricated in COMPARATIVE EXAMPLE 1 during green-color display was about 12 ms. The decay time of the red phosphor was also as long as about 9 ms so that the moving-image quality showed comparatively distinct tailing. In particular, the green-color decay characteristic was found to be conspicuous.

The foregoing comparison has showed that the 1/10 decay time of the red phosphor of the PDP can be adjusted by using a mixture of the (Y,Gd)BO$_3$:Eu phosphor and the Y$_2$O$_3$:Eu phosphor. It has also been found that, if the red phosphor had a decay time of about 6 ms, the green phosphor preferably has a decay time of about 8 ms to 4 ms and optimally a decay time of 6 ms, which is substantially the same as the decay time of the red phosphor.

It has also been provided that, in reducing the decay time of the Zn$_2$SiO$_4$:Mn phosphor composing the green phosphor, the adjustment of the Mn/Zn composition ratio thereof is effective and, for the achievement of a decay time of 8 ms to 4 ms, the composition ratio is preferably in the range of 0.05 to 0.09.

Although the present embodiment has described the case where the blue phosphor was composed of the BaMgAl$_{10}$O$_{14}$:Eu phosphor, the present invention is not limited thereto. The present invention is also applicable to phosphor materials other than those mentioned above and to combinations of phosphor materials other than those mentioned above. The present invention is equally applicable to various particle diameters and sizes.

The size of a PDP to which the present invention is applicable is not particularly limited. The present invention is applicable irrespective of parameters determining the sizes of a PDP including various display sizes (ranging from 20 to 100 inches), resolution, and pixel size.

EMBODIMENT 2

Figure 9:
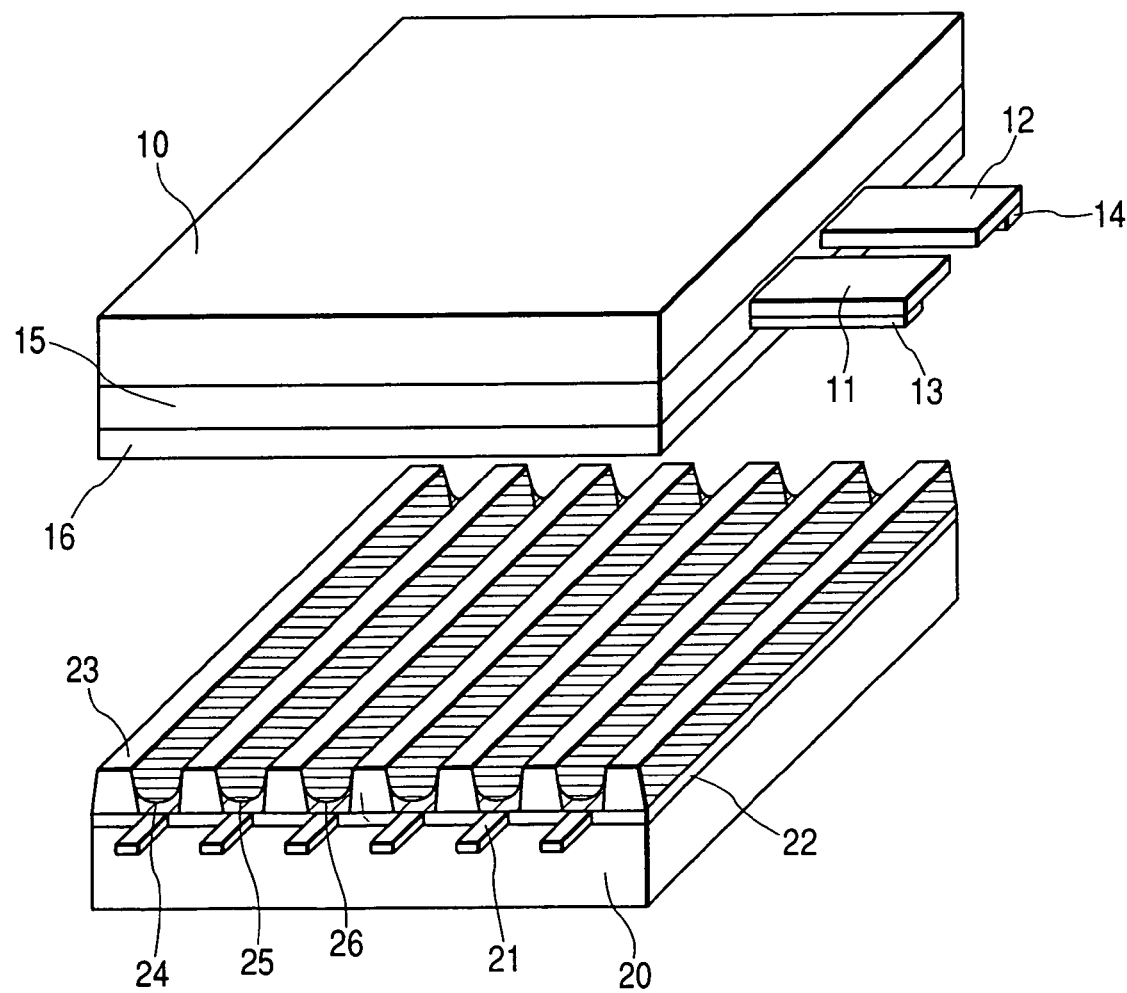
FIG. 9 is an exploded perspective view showing a structure of a plasma display panel in a typical surface-discharge color plasma display device.

Since the PDP of a plasma display device according to the present embodiment has the same structure as the aforementioned PDP shown in FIG. 9, the detailed description thereof will be omitted. In EMBODIMENT 1, the decay characteristic when the Mn/Zn ratio of the Zn$_2$SiO$_4$:Mn phosphor was varied was shown. The present embodiment performed subjective evaluation of decay times and moving-image qualities when the content of a Y$_2$O$_3$:Eu phosphor was varied to 10%, 30%, 50%, 70% and 90% relative to the mixing ratio between the Y$_2$O$_3$:Eu phosphor and a (Y,Gd)BO$_3$:Eu phosphor each composing the red phosphor.

The phosphor layers (24, 25, and 26) correspond to red, green, and blue colors in the same manner as in EMBODIMENT 1. The phosphor layers were formed by preparing 40 weight ratio of red phosphor particles (60 weight ratio of vehicle) in all cases, 35 weight ratio of green phosphor particles (65 weight ratio of vehicle), and 30 weight ratio of blue phosphor particles (70 weight ratio of vehicle), individually mixing the phosphor particles with the vehicles to provide phosphor pastes, coating the phosphor pastes by screen printing, evaporating a volatile component from each of the phosphor pastes and burn-removing an organic material therefrom in a paste dry and baking process. The blue-emission phosphor was a BaMgAl$_{10}$O$_{14}$:Eu phosphor.

The decay times of the red phosphors were 8.5 ms, 7.0 ms, 6.0 ms, 4.0 ms, and 3.5 ms at the respective mixing ratios (contents of Y$_2$O$_4$:Eu) of 10%, 30%, 50%, 70%, and 90%.

Image display with excellent moving-image qualities was obtained in the range of 7.0 to 4.0 ms in the vicinity of 6 ms, which is the decay time of the green phosphor. This proved that the mixing ratio of the red phosphor was preferably in the range of about 30% to 70%.

It has been shown that the 1/10 decay time of the red phosphor of the PDP can be adjusted by using a mixture of the (Y,Gd)BO$_3$:Eu phosphor and the Y$_2$O$_3$:Eu phosphor. It has also been found that, if the green phosphor had a decay time of about 6 ms, the red phosphor preferably has a decay time of about 8 ms to 4 ms (7 ms to 4 ms as a result of the study in the embodiment), which is substantially the same as the decay time of the green phosphor.

It was also found that the mixing ratio between the (Y,Gd)BO3:Eu phosphor composing the red phosphor and the Y$_2$O$_3$:

Eu phosphor was preferably in the range of 30% to 70% in terms of providing a decay time of 8 ms to 4 ms. Similar studies were made also in the case where the $(Y,Gd)BO_3$:Eu phosphor was used in combination with a $(Y,Gd)(P,V)O_4$:Eu phosphor to provide a mixture. In this case, it was found that the mixing ratio (content of the $(Y,Gd)(P,V)O_4$:Eu phosphor) for providing a decay time of 8 ms to 4 ms was preferably in the range of 25% to 95%.

Although the present embodiment has described the case where the blue phosphor was composed of the $BaMgAl_{10}O_{14}$:Eu, the present invention is not limited thereto. The present invention is also applicable to phosphor materials other than those mentioned above and to combinations of phosphor materials other than those mentioned above. The present invention is equally applicable to various particle diameters and sizes.

The size of a PDP to which the present invention is applicable is not particularly limited. The present invention is applicable irrespective of parameters determining the sizes of a PDP including various display sizes (ranging from 20 to 100 inches), resolution, and pixel size.

EMBODIMENT 3

Figure 3:
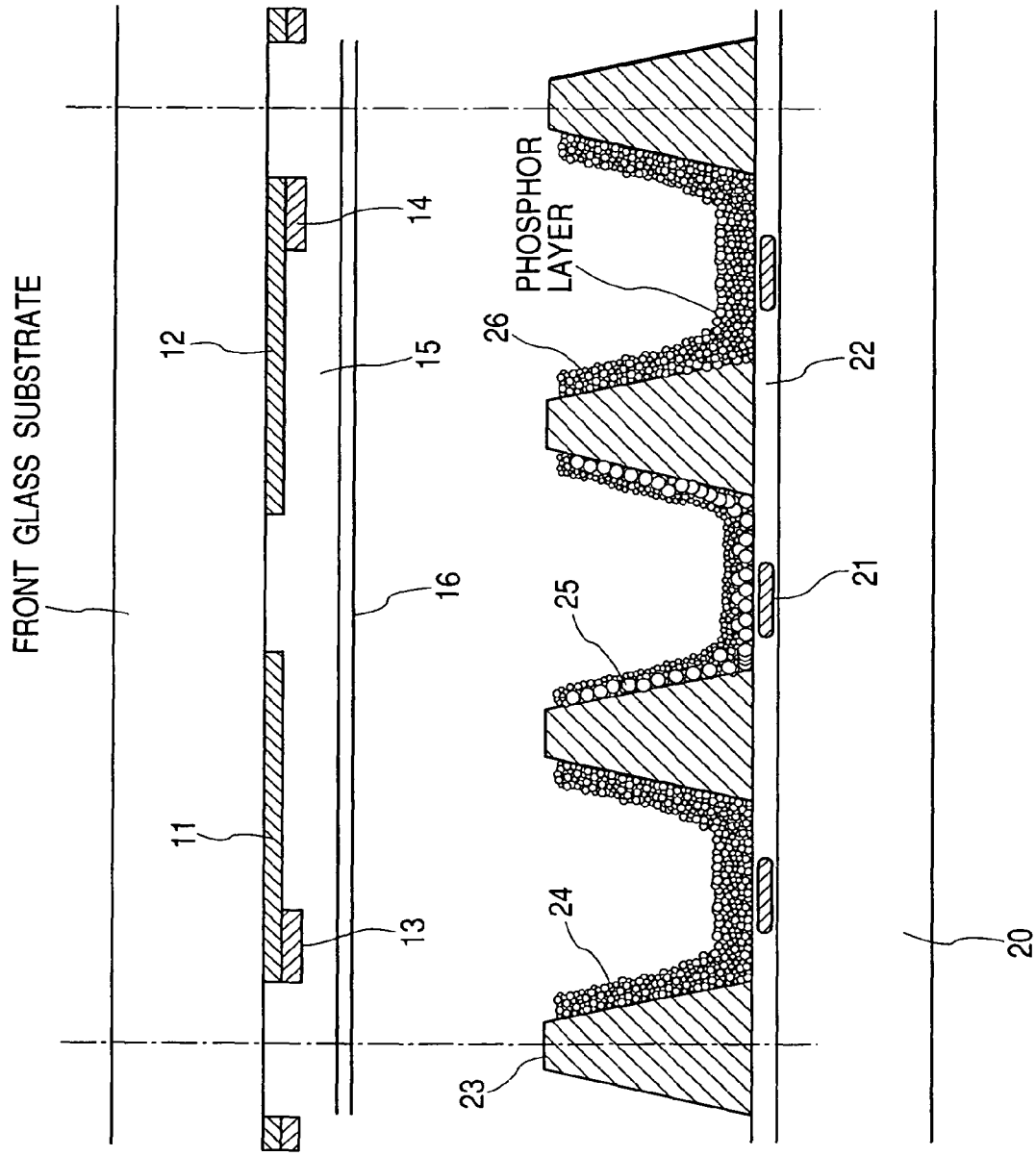
FIG. 3 is a cross-sectional view showing a structure corresponding to one pixel in a plasma display panel according to EMBODIMENT 2 of the present invention.

FIG. 3 is a cross-sectional view showing a structure corresponding to one pixel in a PDP according to the present embodiment. In the present embodiment, a green phosphor was filled in the green phosphor layer 25 by successively printing a $(Y,Gd)_3(Al,Ga)_5O_{12}$:Tb phosphor exhibiting a decay time of 5 ms and a $Zn_2SiO_4$:Mn phosphor exhibiting a decay of 8 ms in two steps by screen printing, whereby the green phosphor layer 25 composed of the two phosphors stacked in layers shown in FIG. 3 was formed.

The phosphor layers (24, 25, and 26) correspond to red, green, and blue colors in the same manner as in EMBODIMENT 1. The phosphor layers were formed by preparing 40 weight ratio of red phosphor particles (60 weight ratio of vehicle), the $Zn_2SiO_4$:Mn phosphor as 14 weight ratio of green phosphor particles (86 weight ratio of vehicle), the $(Y,Gd)_3(Al,Ga)_5O_{12}$:Tb phosphor (where Tb concentration was 10 mol %) as 20 weight ratio of green phosphor particles (80 weight ratio of vehicle), and 30 weight ratio of blue phosphor particles (70 weight ratio of vehicle), individually mixing the phosphor particles with the vehicles to provide phosphor pastes, coating the phosphor pastes by screen printing, evaporating a volatile component from each of the phosphor pastes and burn-removing an organic material therefrom in a paste dry and baking process. The individual materials of the phosphors were as follows: the material composing the red phosphor was a mixture of a $(Y,Gd)BO_3$:Eu phosphor and a $(Y,Gd)(P,V)O_4$:Eu phosphor at a mixing ratio of 60%; the material composing the blue phosphor was a $BaMgAl_{10}O_{14}$:Eu phosphor; and the material composing the green phosphor was the $Zn_2SiO_4$:Mn phosphor and a $Y_3(Al_xGa_{1-x})_5O_{12}$:Tb phosphor (where Tb concentration was 10 mol %), which were prepared individually.

At that time, the $\frac{1}{10}$ decay time of the red phosphor was about 6 ms and the decay time of emission obtained from a stacking type of green phosphor layer was 6 ms so that substantially equal decay characteristics were obtained. Accordingly, a displayed image with an excellent moving-image quality was obtained.

To vary a volume ratio in the stacking type of green phosphor layer, a phosphor paste containing 25 to 10 weight ratio of $Zn_2SiO_4$:Mn green phosphor particles (75 to 90 weight ratio of vehicle) and a phosphor paste containing 10 to 25 weight ratio of $(Y,Gd)_3(Al,Ga)_5O_{12}$:Tb green phosphor particles (where Tb concentration was 10 mol %) (90 to 75 weight ratio of vehicle) were prepared individually and printing formation was performed under the same conditions as described above.

The combinations were determined such that the weight ratio of the phosphor particles becomes 35 in all cases.

The decay characteristics when the volume ratio in the stacking type of green phosphor layer was varied were observed and it was found that the respective $\frac{1}{10}$ decay times were 7 ms, 6.5 ms, 6 ms, and 5.5 ms when the contents of the $(Y,Gd)_3(Al,Ga)_5O_{12}$:Tb phosphor were about 30%, about 40%, about 60%, and about 70%.

Thus, it has been proved that the decay times can be adjusted even in the phosphor layer 25 formed by stacking the $Y_3(Al_xGa_{1-x})_5O_{12}$:Tb phosphor (where Tb concentration was 10 mol %) activated with terbium as a rare earth element and the $Zn_2SiO_4$:Mn phosphor in layers. If the $\frac{1}{10}$ decay time of the red phosphor of the PDP is adjusted to about 6 ms by using the mixture of the $(Y,Gd)BO_3$:Eu phosphor and the $(Y,Gd)(P,V)O_4$:Eu phosphor at a mixing ratio of 60%, the decay time of the stacking type of green phosphor film is preferably about 8 ms to 4 ms (7 ms to 4 ms as a result of the study in the embodiment) and optimally 6 ms, which is substantially the same as the decay time of the red phosphor.

Although the present embodiment has described the case where the blue phosphor was composed of the $BaMgAl_{10}O_{14}$:Eu, the present invention is not limited thereto. The present invention is also applicable to phosphor materials other than those mentioned above and to combinations of phosphor materials other than those mentioned above. The present invention is equally applicable to various particle diameters and sizes.

The size of a PDP to which the present invention is applicable is not particularly limited. The present invention is applicable irrespective of parameters determining the sizes of a PDP including various display sizes (ranging from 15 to 100 inches), resolution, and pixel size.

EMBODIMENT 4

Since the PDP of a plasma display device according to the present embodiment has the same structure as the aforementioned PDP shown in FIG. 9, the detailed description thereof will be omitted.

Figure 4:
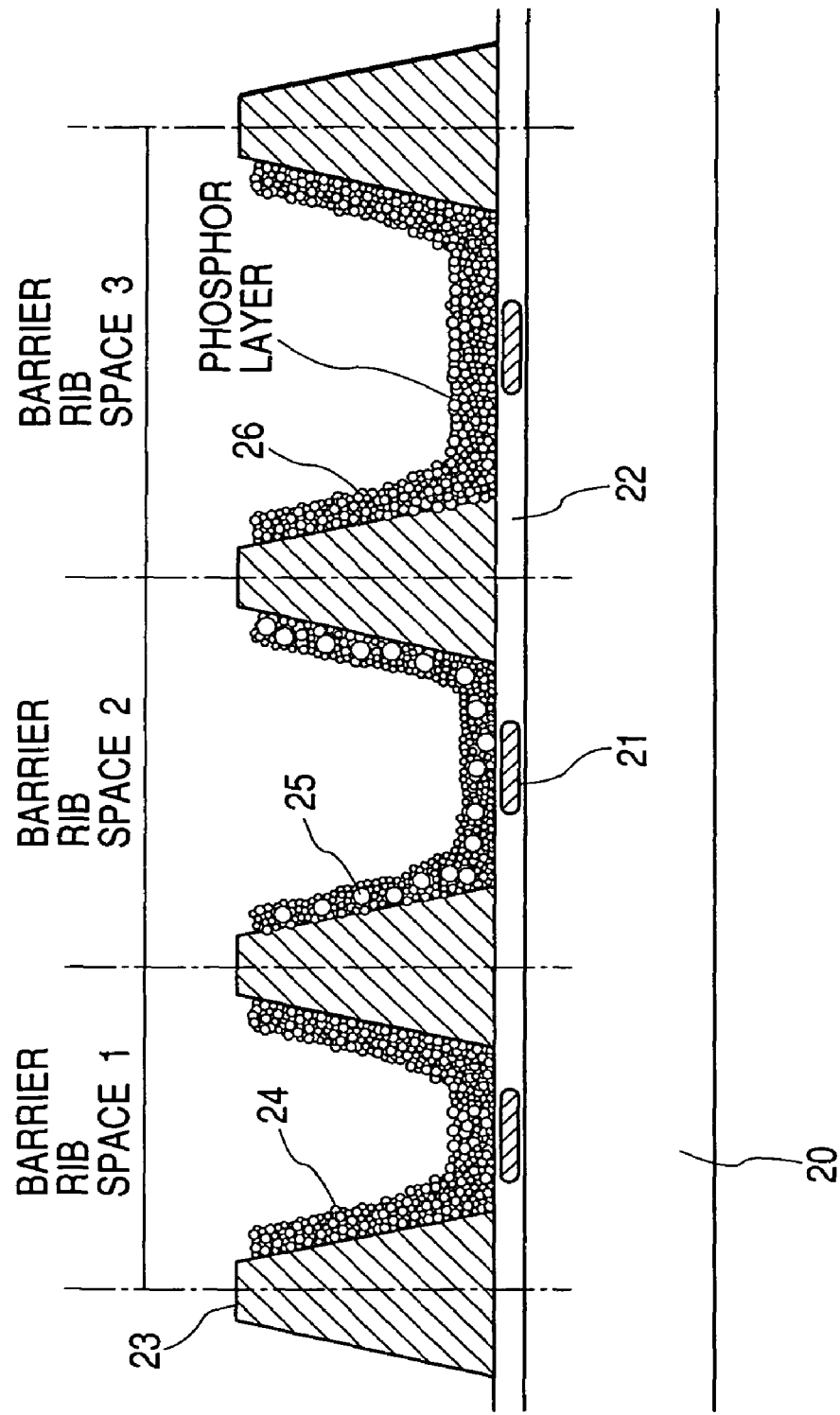
FIG. 4 is a view showing the spaces between barrier ribs which correspond to one pixel in a plasma display panel according to EMBODIMENT 3 of the present invention.

FIG. 4 shows is a view showing the spaces between barrier ribs which correspond to one pixel in the PDP of the plasma display device according to the present embodiment. The present embodiment uses the rear glass substrate 20 having a structure different from that of the rear glass substrate 20 used in each of the foregoing embodiments. By assuming that the size of a green discharge cell (barrier rib space) is 100%, the size of a red discharge cell is 80%, and the size of a blue discharge cell is 120%, the space between the barrier ribs 23 is allowed to vary by 40% at the maximum.

The present embodiment evaluated decay characteristics when the mixing ratio of the $Y_2SiO_5$:Tb phosphor (content of a $Y_2SiO_5$:Tb phosphor) exhibiting a decay time of 4 ms to a $Zn_2SiO_3$:Mn phosphor exhibiting a decay time of 8 ms was varied.

The phosphor layers (24, 25, and 26) shown in FIG. 4 were formed by filling the green phosphor in the phosphor layer 25 by screen printing.

The phosphor layers (24, 25, and 26) correspond to red, green, and blue colors in the same manner as in EMBODIMENT 1. The phosphor layers were formed by preparing 35 weight ratio of red phosphor particles (65 weight ratio of vehicle), the $Zn_2SiO_4$:Mn phosphor and the $Y_2SiO_5$:Tb phosphor as 40 weight ratio of green phosphor particles (62 weight ratio of vehicle), and 50 weight ratio of blue phosphor particles (50 weight ratio of vehicle), individually mixing the phosphor particles with the vehicles to provide phosphor pastes, coating the phosphor pastes by screen printing, evaporating a volatile component from each of the phosphor pastes and burn-removing an organic material therefrom in a paste dry and baking process. The individual materials of the phosphors were as follows: the material composing the red phosphor was a mixture of the (Y,Gd)BO$_3$:Eu phosphor and the (Y,Gd)(P,V)O$_4$:Eu phosphor at a mixing ratio of 60% which has a decay time of about 6 ms. The material composing the blue phosphor was a BaMgAl$_{10}$O$_{14}$:Eu phosphor. As a material composing the green phosphor, a mixture of the Zn$_2$SiO4:Mn phosphor and the Y$_2$SiO$_5$:Tb phosphor at a mixing ratio of 1:1 was prepared.

The decay characteristics when the mixing ratio (the content of the Y$_2$SiO$_5$:Tb phosphor) was varied to 10%, 30%, 50%, 70%, and 90% were such that the respective $\frac{1}{10}$ decay times thereof were 7.5 ms, 6.5 ms, 6 ms, 5 ms, and 4.5 ms.

Thus, it has been proved that the decay times can be adjusted even in the phosphor layer 25 formed by mixing the Zn$_2$SiO$_4$:Mn phosphor with the Y$_2$SiO$_5$:Tb phosphor (where Tb concentration was 10 mol %) activated with terbium as a rare earth element. If the $\frac{1}{10}$ decay time of the red phosphor of the PDP is adjusted to about 6 ms by using the mixture of the (Y,Gd)BO$_3$:Eu phosphor and the (Y,Gd)(P,V)O$_4$:Eu phosphor at a mixing ratio of 60%, the decay time of the stacking type of green phosphor film is preferably about 8 ms to 4 ms (7 ms to 4 ms as a result of the study in the embodiment) and optimally 6 ms, which is substantially the same as the decay time of the red-emission phosphor.

Thus, a relative brightness was high and a chromaticity point having an excellent value was obtained. The phosphor mixture of the Y$_2$SiO$_5$:Tb phosphor activated with terbium as a rare earth element and the Zn$_2$SiO$_4$:Mn phosphor has no limit on the mixing ratio therebetween and the Tb activated concentration.

Green phosphor mixture films composed of the following green-emission phosphors as oxide phosphors each activated with terbium (Tb) as a rare earth element were evaluated. The green phosphors examined were prepared by selecting successively at least one or more materials from a group of phosphors containing, as main components, the compositions represented by the compositional formulae YBO$_3$:Tb, LuBO$_3$:Tb, GdBO$_3$:Tb, ScBO$_3$:Tb, YPO$_4$:Tb, and LaPO$_4$:Tb, which were evaluated for brightness. The mixing ratio was held constant at 50% and the concentration or terbium (Tb) as a rare earth element added for activation was held constant at 5 mol %. A short-decay time was observed when each of LuBO$_3$:Tb, GdBO$_3$:Tb, ScBO$_3$:Tb, and YPO$_4$:Tb, which were phosphors each providing green emission, was mixed with the Zn$_2$SiO$_4$:Mn phosphor.

Although the present embodiment has described the case where the blue phosphor was composed of the BaMgAl$_{10}$O$_{14}$:Eu, the present invention is not limited thereto. The present invention is also applicable to phosphor materials other than those mentioned above and to combinations of phosphor materials other than those mentioned above. The present invention is equally applicable to various particle diameters and sizes.

The size of a PDP to which the present invention is applicable is not particularly limited. The present invention is applicable irrespective of parameters determining the sizes of a PDP including various display sizes (ranging from 15 to 100 inches), resolution, and pixel size.

EMBODIMENT 5

A description will be given herein below to a display system using a PDP according to each of the foregoing embodiments.

Figure 5:
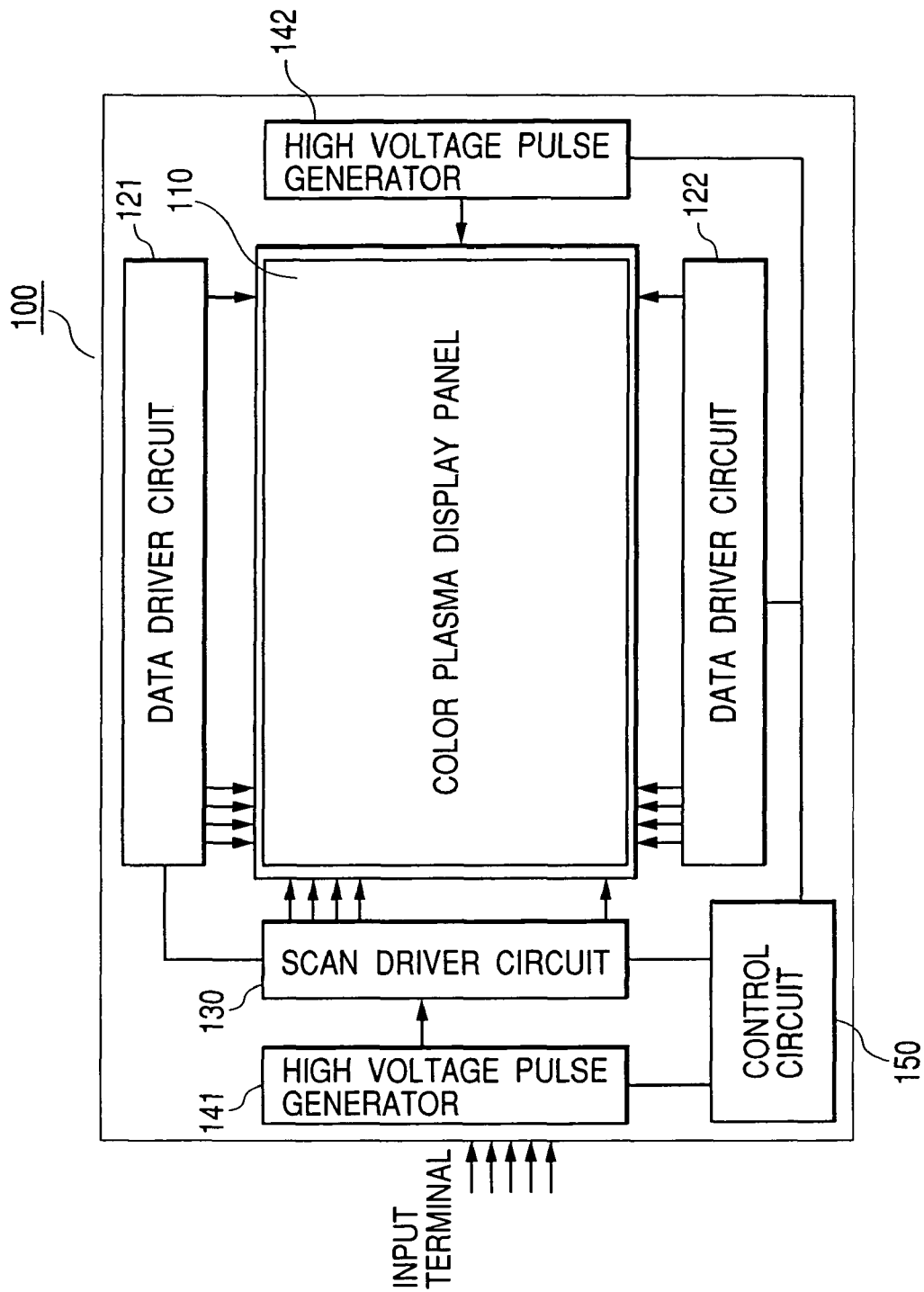
FIG. 5 is a block diagram showing a schematic structure of a plasma display panel using the plasma display panel according to each of the foregoing embodiments.

FIG. 5 is a block diagram showing a schematic structure of a plasma display panel 100 using the PDP according to each of the foregoing embodiments. As shown in the drawing, the plasma display panel 100 is composed of a PDP 110, data driver circuits (121, 122), a scan driver circuit 130, high-voltage pulse generators (141, 142), and a control circuit 150 for controlling each of the foregoing circuits.

The PDP 110 is the PDP described in each of the foregoing embodiments. The PDP 110 is driven by a dual scan method which divides a screen into upper and lower parts for simultaneous driving. Accordingly, the two data driver circuits (121, 122) are provided on the longer-side regions of the PDP 110 to simultaneously drive the upper and lower address electrodes 21.

The scan driver circuit 130 is provided in one of the shorter-side regions of the PDP 110. The scan driver circuit 130 drives a sustaining discharge electrode 22. The high voltage pulse generator 141 generates a high voltage pulse applied from the scan driver circuit 130 to the sustaining discharge electrode 22.

The high voltage pulse generator 142 is provided on the other of the shorter-side regions of the PDP 110. The high voltage pulse generator 142 generates a high voltage pulse to drive the sustaining discharge electrode 21.

Figure 6:
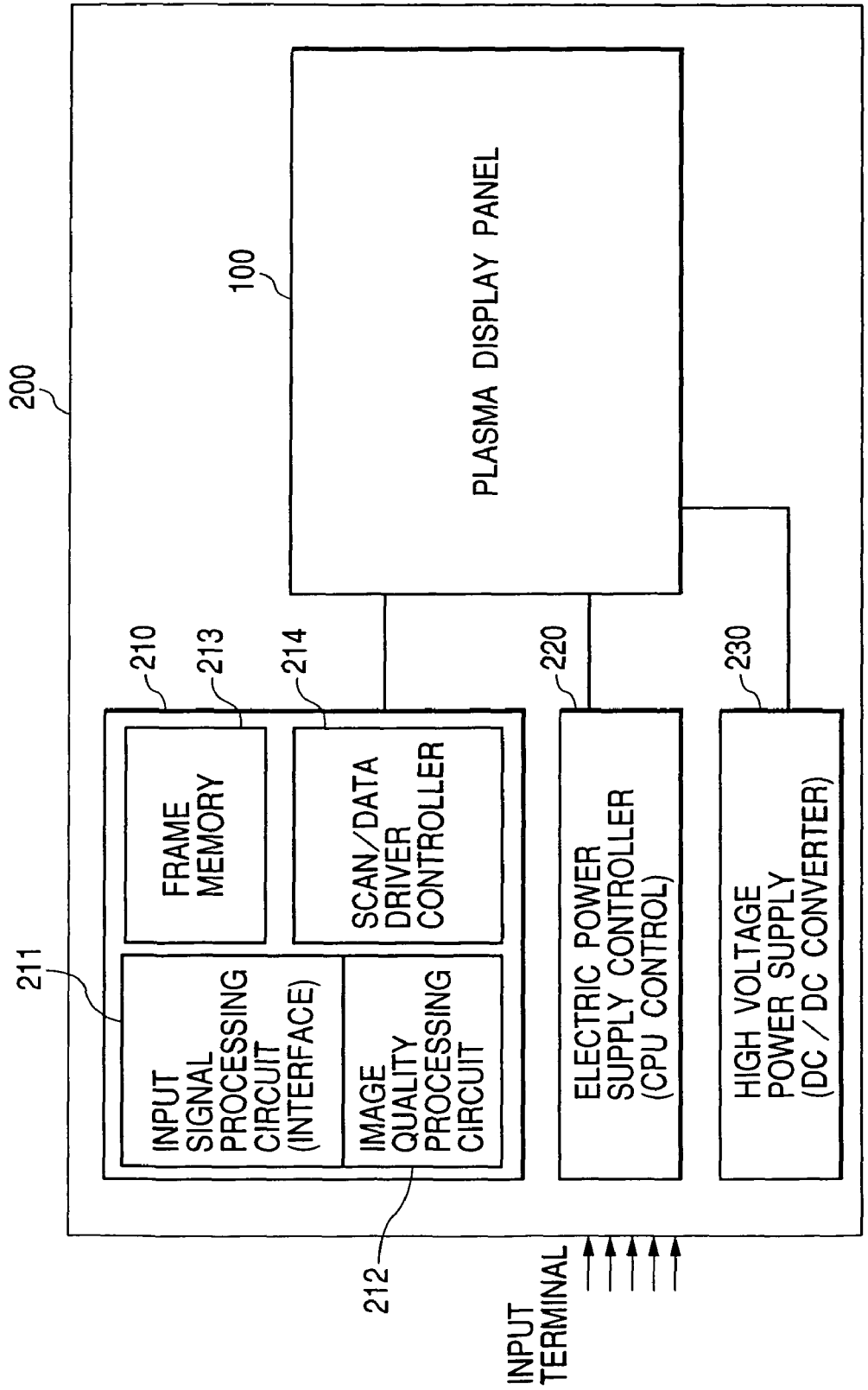
FIG. 6 is a block diagram showing a schematic structure of an example of a plasma display module comprising the plasma display panel shown in FIG. 5.

FIG. 6 is a block diagram showing a schematic structure of an example of a plasma display module 200 having the plasma display panel 100 shown in FIG. 5. As shown in the drawing, the plasma display model 200 is constituted by: a signal processing circuit 210 composed of an input signal processing circuit 211, an image quality processing circuit 212, a frame memory 213, and a scan/data driver control circuit 214; an electric power supply controller 220; a high voltage power supply 230; and a plasma display panel 100. An input image signal inputted to the plasma display module 200 is subjected to signal processing such as γ correction in the input signal processing circuit 211 and the image quality processing circuit 212 and then stored in the frame memory 213. In this case, if the input image signal is an analog signal, it is converted to digital data in the input signal processing circuit 211.

The scan/data driver control circuit 214 controls/drives the data driver circuit (121, 122) and the scan driver circuit 130.

Figure 7:
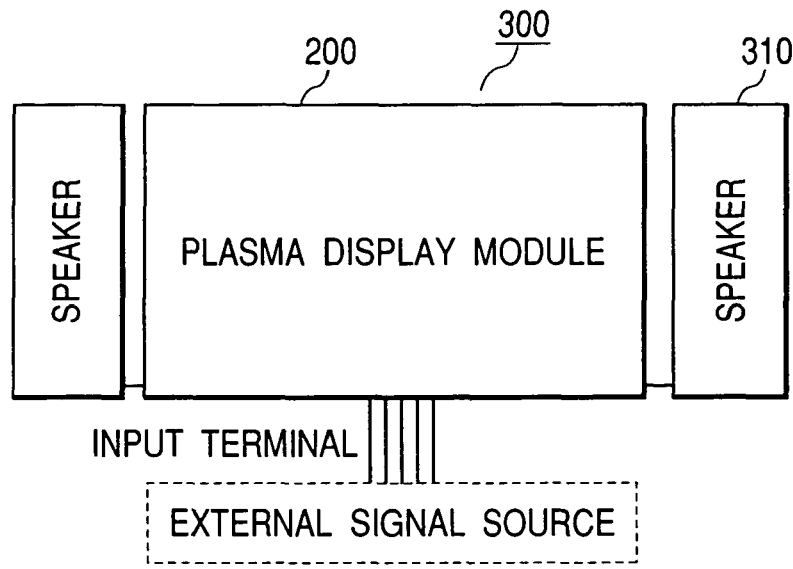
FIG. 7 is a block diagram showing a schematic structure of an example of a plasma display monitor having the plasma display module shown in FIG. 6.
Figure 8:
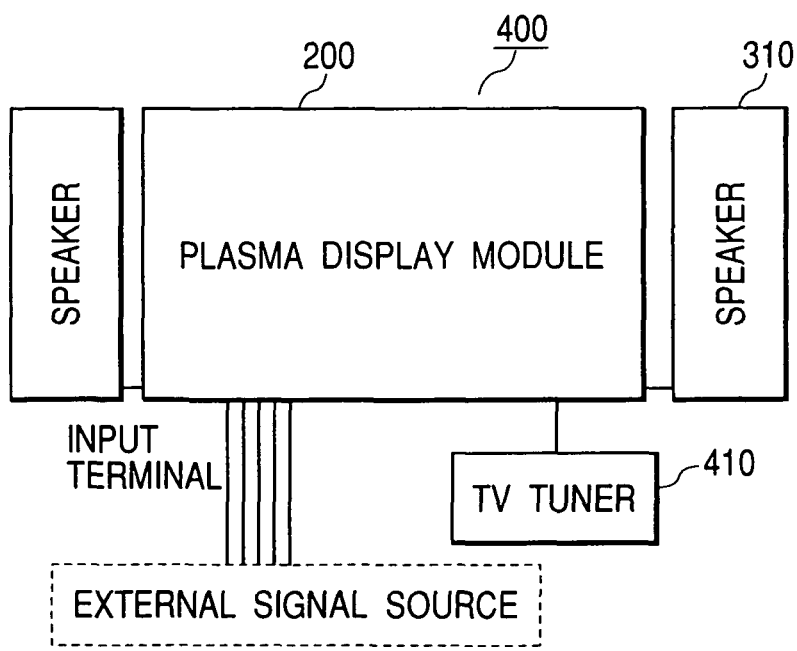
FIG. 8 is a block diagram showing a schematic structure of an example of a plasma display television system having the plasma display module shown in FIG. 6.

FIG. 7 is a block diagram showing a schematic structure of an example of a plasma display monitor 300 having the plasma display module 200 shown in FIG. 6. FIG. 8 is a block diagram showing a schematic structure of an example of a PDP television system 400 having the plasma display module 200 shown in FIG. 6. In FIGS. 7 and 8, 310 is a speaker and 410 is a TV tuner. To the plasma display television monitor 300 shown in FIG. 7 and to the plasma display television system 400 shown in FIG. 8, an image, a voice, and a power are supplied from an external signal source (such as a personal computer, a video deck, a CD/DVD player, an internet terminal, a telephone line, or a digital signal source).

Images obtained from these display systems were high in brightness and quality. In particular, a tailing phenomenon was reduced during moving-image display, which proved a high moving-image quality.

EMBODIMENT 6

Representative phosphors according to the embodiments of the present invention are synthesized as follows. As raw materials for the phosphors, there are used an alkaline earth carbonate compound such as strontium carbonate, a zinc compound such as zinc carbonate, an europium compound such as europium fluoride, a silicon compound such as silicon dioxide, and a halogenated ammonium compound such as ammonium chloride. These raw materials are weigh-collected in accordance with the compositional formula and mixed sufficiently in a wet or dry process. Each of the resulting mixtures is filled in a heat-resistant vessel such as a molten alumina crucible and baked twice. The first baking process is performed in air at 800° C. and the second baking process is performed in a nitrogen gas atmosphere containing 5% hydrogen at a temperature of 1250° C. The baked materials were ground, washed with water, and dried to provide the blue-emission phosphors according to the present invention.

Table 1 shows the compositions of the phosphors and the relative intensities of emission therefrom.

TABLE 1

| Sample No. | Composition of Phosphor | Relative Emission Intensity (%, Excitation at 147 nm) |
|---|---|---|
| 1 | Ca1.9Eu0.1SiO$_4$ | 110% |
| 2 | Sr1.9Eu0.1SiO$_4$ | 110% |
| 3 | Ba1.9Eu0.1SiO$_4$ | 100% |
| 4 | Ba1.9Eu0.1MgSiO$_4$ | 105% |
| 5 | (Ba,Sr,Ca)0.9Eu0.1MgSiO$_4$ | 110% |
| 6 | (Ba,Sr,Ca)0.9Eu0.1(Mg0.9,Zn0.1)SiO$_4$ | 115% |
| 7 | (Ca)0.9Eu0.1MgSi$_2$O$_6$ | 100% |
| 8 | (Ba,Sr,Ca)0.9Eu0.1(Mg0.9,Zn0.1)Si$_2$O$_6$ | 110% |
| Comparative Sample | Ba0.9MgAl$_{10}$O$_{17}$:Eu0.1 | 100% |

At least some of the samples of Table 1 provide a compositional formula of the phosphor of $(Ae)_{1-c}(Mg_{0.9}, Zn_{0.1})Si_2O_6:Eu_c$, wherein Ae is at least one of an alkaline earth element selected from the group consisting of Sr, Ca and Ba, and c satisfies $0.01 \leq c \leq 0.3$ Of the phosphors, the sample 5 was synthesized as follows. The following raw materials BaCO$_3$: 0.3 mol×0.1 5.92 g, SrCO$_3$: 0.3 mol×0.1 4.42 g, CaCO$_3$: 0.3 mol×0.1 3.00 g, MgCO$_3$: 1 mol×0.1 8.43 g, SiO$_2$: 1 mol×0.1 6.01 g, Eu$_2$O$_3$: 0.1 mol×0.05 1.76 g, and NH$_4$Cl: 0.1 g were weight-collected and mixed sufficiently in required quantities. The resulting mixture was filled in the heat-resistance vessel such as a molten alumina crucible, baked in air at 800° C., and then baked in a nitrogen gas atmosphere containing 5% hydrogen at a temperature of 1250° C. The baked material was ground, washed with water, and dried to provide the blue-emission phosphor. The other phosphors were similarly synthesized. Thereafter, the respective relative intensities of emission from the samples were determined by assuming that the brightness of emission from the currently used BAM phosphor under excitation caused by a vacuum UV beam at 147 nm was 100%. The results were 100% to 115%, as shown in Table 1.

It was also proved that the lifetime properties of the phosphors were improved compared with those of comparative samples.

EMBODIMENT 7

Phosphors (samples 9 to 20) partly substituted by Ca, Sr, Ba, Mg, or Zn shown in Table 2 were synthesized by using the raw materials listed above and following a similar synthesizing process. It was found that emission from each of the phosphors had a relatively high brightness under 147 nm UV beam excitation. Specific emission intensities are shown in Table 2. The lifetime properties of the phosphors were found to be improved compared with those of comparative samples.

EMBODIMENT 8

Plasma display panels (PDPs) were fabricated by using, as blue phosphors each composing a blue phosphor film, divalent europium activated alkaline earth silicate phosphors (having the compositions shown in Tables 1 and 2) according to the present invention.

TABLE 2

| Sample No. | Composition of Phosphor | Relative Emission Intensity (%, Excitation at 147 nm) |
|---|---|---|
| 9 | (Ba,Sr,Ca)0.99Eu0.01MgSiO$_4$ | 105% |
| 10 | (Ba,Sr,Ca)0.95Eu0.05MgSiO$_4$ | 108% |
| 11 | (Ba,Sr,Ca)0.8Eu0.2MgSiO$_4$ | 105% |
| 12 | (Ba,Sr,Ca)0.7Eu0.3MgSiO$_4$ | 100% |
| 13 | Ba0.9Eu0.1(Mg0.9,Zn0.1)SiO$_4$ | 110% |
| 14 | Ba0.9Eu0.1(Mg0.8,Zn0.2)SiO$_4$ | 110% |
| 15 | Ba0.9Eu0.1(Mg0.5,Zn0.5)SiO$_4$ | 100% |
| 16 | Ba0.9Eu0.1ZnSiO$_4$ | 90% |
| 17 | Ca0.9Eu0.1(Mg0.99,Zn0.01)Si$_2$O$_6$ | 115% |
| 18 | Ca0.9Eu0.1(Mg0.9,Zn0.1)Si$_2$O$_6$ | 110% |
| 19 | Ca0.9Eu0.1(Mg0.8,Zn0.2)Si$_2$O$_6$ | 100% |
| 20 | Ca0.9Eu0.1ZnSi$_2$O$_6$ | 80% |
| Comparative Sample | Ba0.9MgAl$_{10}$O$_{17}$:Eu0.1 | 100% |

At least some of the samples of Table 2 provide a compositional formula of the phosphor of $Ca0.9Eu0.1(Mg_{1-d}, Zn_d)Si_2O_6$, wherein d satisfies $0.01 \leq d \leq 2$ or d=1.

In PDPs such as the surface-discharge color PDPs according to the present embodiment, a discharge is induced by, e.g., applying a negative voltage to a sustaining discharge electrode (generally termed a scan electrode) and applying a positive voltage (which is positive relative to the voltage applied to the sustaining discharge electrode) to an address electrode and to a sustaining discharge electrode, whereby a wall charge which helps to initiate a discharge between the sustaining discharge electrodes is formed (which is termed writing). If an appropriate inverse voltage is applied between the sustaining discharge electrodes in this state, a discharge occurs in a discharge space between the two electrodes via a dielectric layer (and protection layer). After the discharge is completed, if the voltage applied to the sustaining discharge electrodes is inverted, a discharge newly occurs. By repeating the foregoing procedure, a continuous discharge occurs (which is termed a sustained discharge or a display discharge).

In the PDP according to the present embodiment, the address electrodes composed of silver or the like and a dielectric layer composed of a glass-based material are formed on a rear glass electrode and then a barrier rib material similarly composed of a glass-based material is thin-film printed thereon so that barrier ribs are formed by blast removal using a blast mask. Subsequently, red, green, and blue phosphor layers are formed successively in stripes on the barrier ribs in such a manner as to cover the groove surfaces between the corresponding barrier ribs. The phosphor layers correspond to red, green, and blue colors. The phosphor layers are formed by preparing 40 weight ratio of red phosphor particles (60 weight ratio of vehicle), 35 weight ratio of green phosphor particles (65 weight ratio of vehicle), and 35 weight ratio of blue phosphor particles (65 weight ratio of vehicle), individually mixing the phosphor particles with the vehicles to provide phosphor pastes, coating the phosphor pastes by screen printing, evaporating a volatile component from each of the phosphor pastes and burn-removing an organic material therefrom in a paste dry and baking process. The phosphor layers used in the present embodiment are composed of phosphor particles each having a center diameter of 3 µm. The individual materials of the phosphors are as follows: the material of the red phosphor is a 1:1 mixture of a (Y,Gd)$BO_3$:Eu phosphor and a $Y_2O_3$:Eu phosphor; and the material of the green phosphor is a $Zn_2SiO_4$:Mn phosphor. Next, the front glass substrate formed with the sustaining discharge electrodes, the bus electrodes, the dielectric layer, and the protection layer and the rear glass substrate are frit-sealed. After the panel is evacuated, a discharge gas is injected therein and sealed. Each of the PDPs according to the present embodiment has a 3 screen size and the pitch of one pixel therein is 1000 µm×1000 µm.

Next, plasma display devices were fabricated by using the phosphors formed in EMBODIMENTS 6 and 7, which were filled in the respective phosphor layers 25. As the red and green phosphors, the same materials were used. The initial brightnesses and lifetime properties of the plasma display devices were examined. The panel obtained had a more excellent color tone, a higher brightness, and a longer lifetime than a conventional panel fabricated by replacing only the blue phosphor with a divalent europium activated barium magnesium aluminate. As a result of examination, the initial brightnesses were nearly equal to the relative intensities of emission from the powders shown in relation to the individual phosphors in Table 2 and the lifetime performance of each of the phosphors (each of the compositions shown in Tables 1 and 2) was longer than that of each of the comparative phosphors.

Although the present embodiment has not shown a detailed result of examination performed with respect to the red and green phosphors, a PDP can also be fabricated in the same manner if each of phosphors having the following compositions is used. The red phosphor may include one or more of (Y,Gd)$BO_3$:Eu, (Y,Gd)$_2O_3$:Eu, and (Y,Gd) (P,V)$O_4$:Eu phosphors. The green phosphor may include one or more selected from the group consisting of $Zn_2SiO_4$:Mn, (Y,Gd,Sc)$_2SiO_5$:Tb, (Y,Gd)$_3$(Al,Ga)$_5O_{12}$:Tb, (Y,Gd)$_3$(Al,Ga)$_5O_{12}$:Ce, (Y,Gd)$B_3O_6$:Tb, and (Y,Gd)$PO_4$:Tb. A combination with a phosphor not shown herein can also be used.

EMBODIMENT 9

Figure 10:
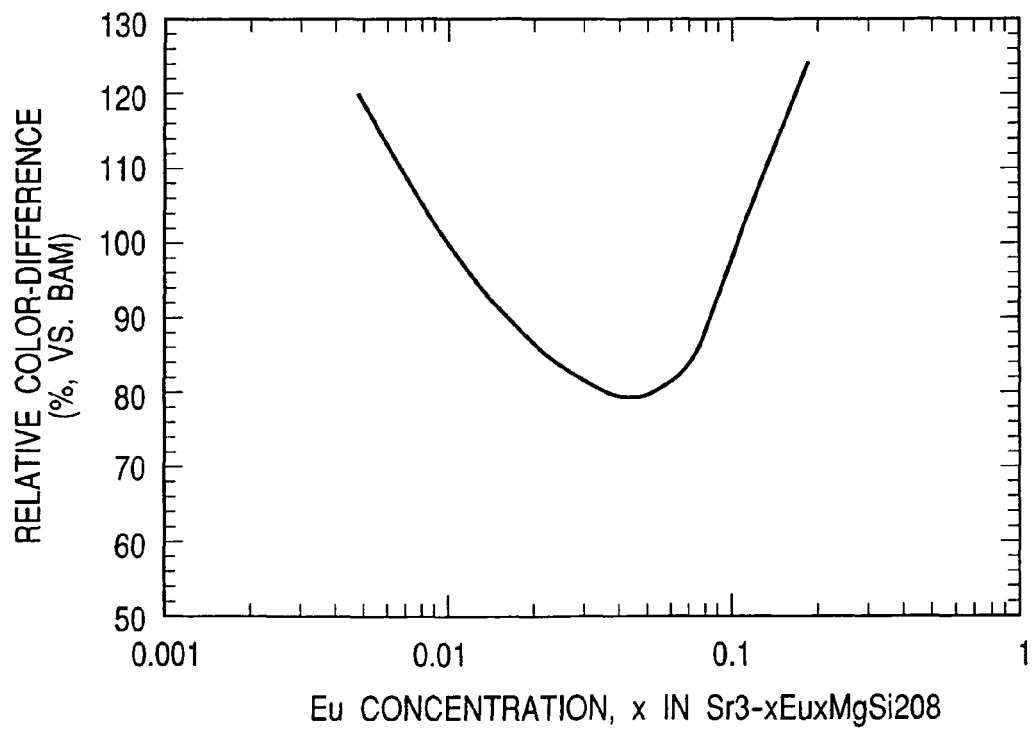
FIG. 10 is a graph showing the dependence of the relative color-difference of $Sr_{3-x}MgSi_2O_8$; $Eu_x$ on Eu concentration.

FIG. 10 shows the dependence of the relative color-difference of $Sr_{3-x}MgSi_2O_8$:$Eu_x$ on Eu concentration when the color-difference between the uniform-chromaticity coordinates (U, V) of fluorescent colors and an NTSC-based blue color point is assumed to be 100%. From the drawing, excellent color tones are obvious since the colors obtained in the present embodiment are closer to the NTSC blue color point than the color obtained from the currently used BAM phosphor in the range in which the Eu concentration (x) satisfies 0.01≦x≦0.01. The luminous efficiencies were at the same level as that of the BAM phosphor and the lifetime was also long. Table 3 shows the compositions of the phosphors and the relative color-differences of emission therefrom.

TABLE 3

| Sample No. | Composition of Phosphor | Relative Color-Difference of Emission (%, Excitation at 147 nm) |
|---|---|---|
| 21 | Sr2.99Eu0.01MgSi$_2$O$_8$ | 99% |
| 22 | Sr2.98Eu0.02MgSi$_2$O$_8$ | 86% |
| 23 | Sr2.97Eu0.03MgSi$_2$O$_8$ | 82% |
| 24 | Sr2.95Eu0.05MgSi$_2$O$_8$ | 80% |
| 25 | Sr2.90Eu0.10MgSi$_2$O$_8$ | 98% |
| Comparative Sample | Ba0.9MgAl$_{10}$O$_{17}$:Eu0.1 | 100% |

The sample 24 was synthesized as follows. The following raw materials $SrCO_3$: 4.385 g, $MgCO_3$: 0.907 g, $SiO_2$: 1.00 g, $Eu_2O_3$: 0.053 g, $NH_4Cl$: 00.22 g were mixed sufficiently. The resulting mixture was filled in the heat-resistance vessel such as a molten alumina crucible, baked in air at 800° C., and then baked in a nitrogen gas atmosphere containing 5% hydrogen at a temperature of 1250° C. The baked material was ground, washed with water, and dried to provide a blue-emission phosphor. The relative color-difference of the sample 4 when the color-difference between the isochromatic coordinates (U, V) of fluorescent colors and the NTSC-based blue color point is assumed to be 100% is 80%. This indicates an excellent color tone since the color obtained in the present embodiment is closer to the NTSC blue color point than that of the currently used BAM phosphor. Likewise, the samples 21, 22, 23, and 25 were synthesized. The phosphors exhibited excellent relative color-differences of 99, 86, 82, and 87%.

The foregoing results are shown in FIG. 10 as the dependence of the relative color-difference of the phosphor in question on Eu concentration (x). From the drawing, it is obvious that the effective range of Eu is 0.01≦x≦0.1. It is to be noted that the brightness of emission from the phosphor falling within the Eu concentration range is at the same level as emission from the BAM phosphor.

EMBODIMENT 10

Phosphors (samples 26 to 40) partly substituted by Ca, Sr, Ba, Mg, or Zn shown in Table 4 were synthesized by using the raw materials listed above and following a similar synthesizing process. It was found that emission from each of the phosphors had a relatively high brightness under 147 nm UV beam excitation.

EMBODIMENT 11

Plasma display panels (PDPs) were fabricated by using, as blue phosphors each composing a blue phosphor film, divalent europium activated alkaline earth silicate phosphors (having the compositions shown in Tables 3 and 4) according to the present invention.

TABLE 4

| Sample No. | Composition of Phosphor | Relative Emission Intensity (%, Excitation at 147 nm) |
|---|---|---|
| 26 | $Sr_{2.87}Ca_{0.1}Eu_{0.03}MgSi_2O_8$ | 100% |
| 27 | $Sr_{2.96}Ca_{0.03}Eu_{0.99}Zn_{0.01}Si_2O_8$ | 100% |
| 28 | $Sr_{2.87}Ca_{0.1}Eu_{0.03}Mg_{0.99}Zn_{0.01}Si_2O_8$ | 103% |
| 29 | $Ca_{2.9}Eu_{0.1}MgSi_2O_8$ | 100% |
| 30 | $Ca_{2.4}Ba_{0.5}Eu_{0.1}MgSi_2O_8$ | 105% |
| 31 | $Sr_{2.8}Ba_{0.1}Eu_{0.1}MgSi_2O_8$ | 100% |
| 32 | $Sr_{2.4}Ba_{0.5}Eu_{0.1}MgSi_2O_8$ | 110% |
| 33 | $Sr_{1.9}Ba_{1.0}Eu_{0.1}MgSi_2O_8$ | 115% |
| 34 | $Sr_{0.9}Ba_{2.0}Eu_{0.1}MgSi_2O_8$ | 115% |
| 35 | $Ba_{2.9}Eu_{0.1}MgSi_2O_8$ | 110% |
| 36 | $Sr_{2.4}Ba_{0.5}Eu_{0.1}Mg_{0.99}Zn_{0.01}Si_2O_8$ | 115% |
| 37 | $Sr_{2.3}Ba_{0.5}Ca_{0.1}Eu_{0.1}Mg_{0.99}Zn_{0.01}Si_2O_8$ | 115% |
| 38 | $Sr_{2.49}Ba_{0.5}Eu_{0.01}MgSi_2O_8$ | 100% |
| 39 | $Sr_{2.45}Ba_{0.5}Eu_{0.05}MgSi_2O_8$ | 105% |
| 40 | $Sr_{2.3}Ba_{0.5}Eu_{0.2}MgSi_2O_8$ | 110% |
| Comparative Sample | $Ba_{0.9}MgAl_{10}O_{17}:Eu_{0.1}$ | 100% |

At least some of samples 26 to 40 of Table 4 provide a compositional formula of the phosphor of $(Ae)_{3-x}(Ae')Si_2O_8:Eu_x$, wherein x satisfies $0.01 \leq x \leq 0.1$, Ae is at least one alkaline earth element selected from the group consisting of Sr, Ca, and Ba, and Ae' is at least one element selected from the group consisting of Zn or (Zn plus Mg); or provides a compositional formula of the phosphor of $(Sr_{1-y}Ba_y)_{3-x}(Ae')Si_2O_8:Eu_x$, wherein x satisfies $0.01 \leq x \leq 0.1$, y satisfies $0 \leq y \leq 1$, and Ae' is at least one element selected from the group consisting of Zn or (Zn plus Mg).

In PDPs such as the surface-discharge color PDPs according to the present embodiment, a discharge is induced by, e.g., applying a negative voltage to a sustaining discharge electrode (generally termed a scan electrode) and applying a positive voltage (which is relative to the voltage applied to the sustaining discharge electrode) to an address electrode and to a sustaining discharge electrode, whereby a wall charge which helps to initiate a discharge between the sustaining discharge electrodes is formed (which is termed writing). If an appropriate inverse voltage is applied between the sustaining discharge electrodes in this state, a discharge occurs in a discharge space between the two electrodes via a dielectric layer (and protection layer). After the discharge is completed, if the voltages applied to the sustaining discharge electrodes is inverted, a discharge newly occurs. By repeating the foregoing procedure, a continuous discharge occurs (which is termed a sustained discharge or a display discharge).

In the PDP according to the present embodiment, the address electrode composed of silver or the like and a dielectric layer composed of a glass-based material are formed on a rear glass electrode and then a barrier rib material similarly composed of a glass-based material is thin-film printed thereon so that barrier ribs are formed by blast removal using a blast mask. Subsequently, red, green, and blue phosphor layers are formed successively in stripes on the barrier ribs in such a manner as to cover the groove surfaces between the corresponding barrier ribs. The phosphor layers correspond to red, green, and blue colors. The phosphor layers are formed by preparing 40 weight ratio of red phosphor particles (60 weight ratio of vehicle), 35 weight ratio of green phosphor particles (65 weight ratio of vehicle), and 35 weight ratio of blue phosphor particles (65 weight ratio of vehicle), individually mixing the phosphor particles with the vehicles to provide phosphor pastes, coating the phosphor pastes by screen printing, evaporating a volatile component from each of the phosphor pastes and burn-removing an organic material therefrom in a paste dry and baking process. The phosphor layers used in the present embodiment are composed of phosphor particles each having a center diameter of 3 μm. The individual materials of the phosphors are as follows: the material of the red phosphor is a 1:1 mixture of a $(Y,Gd)BO_3:Eu$ phosphor and a $Y_2O_3:Eu$ phosphor: and the material of the green phosphor is a $Zn_2SiO_4:Mn$ phosphor. Next, the front glass substrate formed with the sustaining discharge electrodes, the bus electrodes, the dielectric layer, and the protection layer and the rear glass substrate are frit-sealed. After the panel is evacuated, a discharge gas is injected therein and sealed. Each of the PDPs according to the present embodiment has a 3 screen size and the pitch of one pixel therein is 1000 μm×1000 μm.

Next, plasma display devices were fabricated by using the phosphors formed in EMBODIMENTS 6 and 7, which were filled in the respective phosphor layers 25. As the red and green phosphors, the same materials were used. The initial brightnesses and lifetime properties of the plasma display devices were examined.

The panel obtained had an excellent color tone, a higher brightness, and a longer lifetime than a conventional panel fabricated by replacing only the blue phosphor with a divalent europium activated barium magnesium aluminate phosphor.

As a result of examination, the relative intensities of emission shown in relation to the individual phosphors in Table 4 were obtained and the initial brightnesses were equal or superior to those of emission from the divalent europium activated barium magnesium aluminate phosphors as comparative samples. The result also showed the lifetime performance of each of the phosphors (each of the compositions shown in Tables 3 and 4) which was superior to that of each of the comparative phosphors.

Although the present embodiment has not shown a detailed result of examination performed with respect to the red and green phosphors, a PDP can also be fabricated in the same manner if each of phosphors having the following compositions is used. The red phosphor may include one or more of $(Y,Gd)BO_3:Eu$, $(Y,Gd)_2O_3:Eu$, and $(Y,Gd)(P,V)O_4:Eu$ phosphors. The green phosphor may include one or more selected from the group consisting of $(Y,Gd,Sc)_2SiO_5:Tb$, $(Y,Gd)_3(Al,Ga)_5O_{12}:Tb$, $(Y,Gd)_3(Al,Ga)_5O_{12}:Ce$, $(Y,Gd)B_3O_6:Tb$, and $(Y,Gd)PO_4:Tb$ phosphors. A combination with a phosphor not shown herein can also be used.

EMBODIMENT 12

Rare-gas (xenon) discharge cool white fluorescent lamps were fabricated by using the divalent europium activated alkaline earth silicate phosphors (having the compositions shown in Tables 1 and 3) according to the present invention as blue phosphors, divalent manganese activated zinc silicate phosphors as green phosphors, and trivalent europium activated yttrium gadolinium oxide phosphors as red phosphors. Each of the lamps had a higher luminous efficiency and a longer lifetime than a conventional lamp fabricated by replacing only the blue phosphor with a divalent europium activated barium magnesium aluminate phosphor.

EMBODIMENT 13

Flat-panel rare-gas (xenon) discharge cool white fluorescent lamps were fabricated by using the divalent europium activated alkaline earth silicate phosphors (having the compositions shown in Tables 2 and 4) according to the present invention as blue phosphors, divalent manganese activated zinc silicate phosphors as green phosphors, and trivalent europium activated yttrium gadolinium oxide phosphors as red phosphors. Each of the lamps had a higher luminous efficiency and a longer lifetime than a conventional lamp fabricated by replacing only the blue phosphor with a divalent europium activated barium magnesium aluminate phosphor.

EMBODIMENT 14

Here, uniform transparent electrodes are formed initially on the inner surfaces of glass substrates to be formed with phosphor films. Then, the divalent europium activated alkaline earth silicate phosphors (having the compositions shown in Tables 1 to 4) according to the present invention, the divalent manganese activated zinc silicate phosphors, and the trivalent europium activated yttrium gadolinium oxide phosphors were formed successively as blue phosphors composing blue phosphor films, as green phosphors composing green phosphor films, and as red phosphors composing red phosphors, respectively. Each of the glass substrates and the other glass substrate into which an extremely small electron beam source has been incorporated were bonded to each other in integral relation, sealed, and evacuated, whereby 10 screen field-emission display (FED) panels were fabricated. Each of the panels showed such characteristics as a higher efficiency and a longer lifetime than a conventional FED panel fabricated by replacing only the blue phosphor with a divalent europium activated barium magnesium aluminate phosphor. As a result of constructing display panels by using these panels and using them as display systems in a television, a video, an automobile, and the like, it was found that high display qualities were obtainable. Thus, longer lifetimes and higher image qualities were achieved by using blue phosphors (divalent europium activated alkaline earth silicate phosphors) each having a high efficiency under excitation caused by a vacuum UV beam and a low-speed electrode beam in rare-gas discharge display/luminescent devices or in field-emission display (FED) devices.

EMBODIMENT 15

As raw materials, $BaCO_3$ (2.98 xmol %) [$0 \leq x \leq 1$], $SrCO_3$ (2.98 (1-x) mol %), $MgCO_3$ (1 mol %), $SiO_2$ (2 mol %), and $Eu_2O_3$ (0.01 mol %) were weigh-collected and mixed. The resulting mixture was baked in an alumina crucible at 1300° C. for three hours. The baked material was ground and baked in a reducing atmosphere at 1300° C. for three hours. The baked material was ground by using a ball mill, washed with water, classified, and dried to provide a phosphor represented by $(Ba_xSr_{1-x})_{2.98}MgSi_2O_8:Eu_{0.02}$ [$0 \leq x \leq 1$]. A phosphor paste was prepared by mixing 40 weight ratio of the present phosphor with 60 weight ratio of a vehicle, coated by screen printing on a glass substrate, and dried. A phosphor film was formed by performing a baking process and thereby removing a volatile component and an organic material from the paste.

Figure 11:
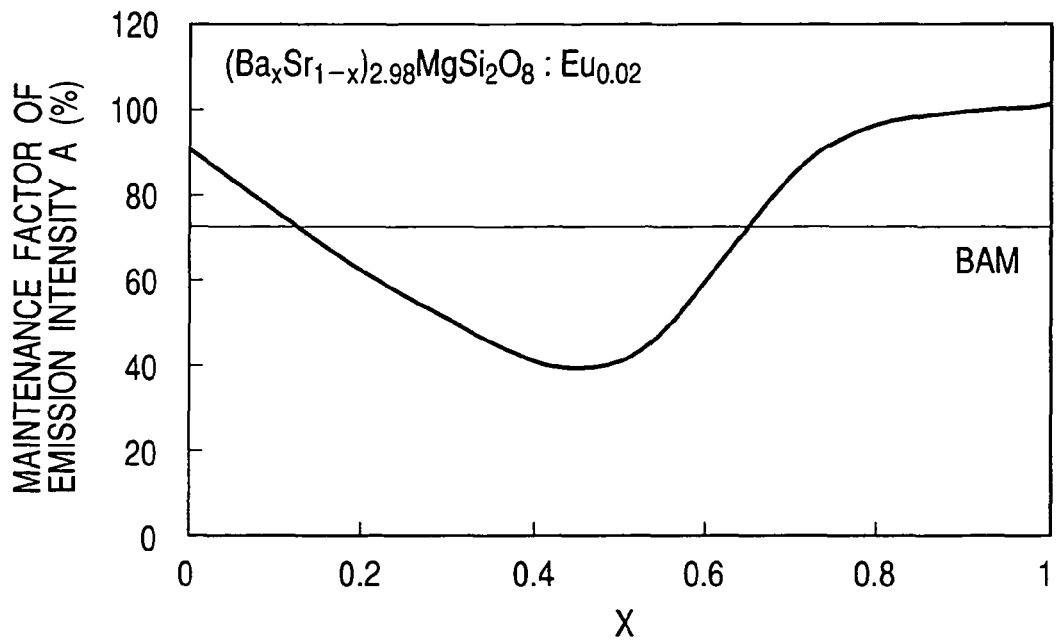
FIG. 11 is a graph showing the maintenance factor of emission in intensity/brightness.

A baked paste powder was produced by peeling off the phosphor from the upper surface of the glass substrate and the intensity (A1) of emission from the baked paste powder under excitation caused by an excimer lamp (at a center wavelength of 146 nm) was measured. At the same time, the intensity (A0) of emission from the original phosphor powder, which was unprinted and unbaked, was also measured. As an index indicative of degradation in the paste baking process, a maintenance factor of emission in intensity (A=A1/A0×100) was used. For comparison, similar measurement was performed also for a BAM phosphor used commonly as a blue phosphor. FIG. 11 shows the maintenance factor of emission in intensity/brightness (A). It was proved that, when the paste was baked, the $(Ba_ySr_{1-y})_{3-x}MgSi_2O_8:Eu_x$ phosphor [$0 \leq x \leq 0.1$ or $0.65 \leq x \leq 1$] and [$0 \leq y \leq 0.1$ or $0.65 \leq y \leq 1$] had a higher maintenance factor of emission in intensity and more excellent characteristics with reduced degradation than the BAM phosphor.

EMBODIMENT 16

Figure 12:
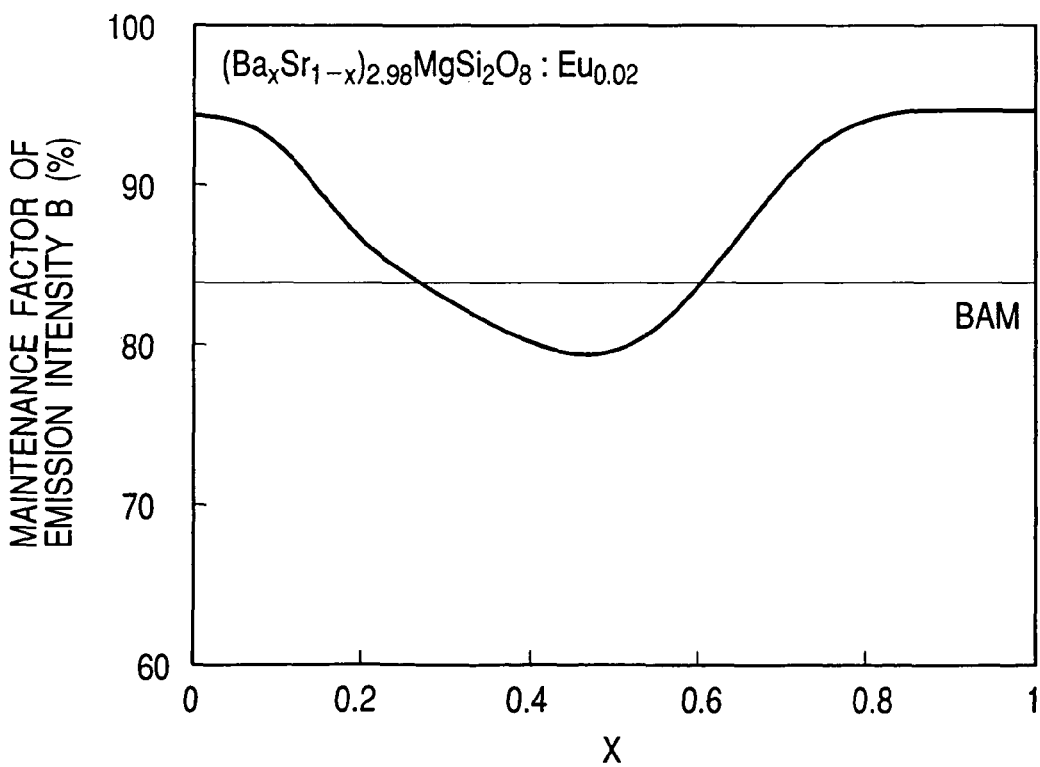
FIG. 12 is a graph showing the maintenance factor of emission in intensity.

By using a phosphor according to the present invention, a PDP was fabricated and a driving degradation characteristic thereof was measured. FIG. 9 is a schematic view of a display panel in the PDP. The PDP was obtained by bonding a front glass substrate and a rear glass substrate to each other in integral relation. After the formation of address electrodes and barrier ribs on the rear glass substrate, $Ba_3MgSi_2O_8:Eu$ phosphor layers were formed between the barrier ribs. A phosphor paste was prepared by mixing 40 weight ratio of the phosphor with 60 weight ratio of a vehicle and coated by screen printing. A volatile component in the paste was removed and an organic material was burn-removed therefrom in a paste dry and baking process, whereby the phosphor layers were formed on the rear glass substrate. The rear glass substrate formed with the phosphor layers and the front glass substrate were bonded to each other to fabricate a plasma display panel in which a discharge gas has been sealed. The driving-time-varying characteristic of the emission intensity of the plasma display panel was measured by measuring an emission intensity (B0) at the initiation of panel driving and an emission intensity (B1) when 500 hours elapsed after panel driving. As an index indicative of degradation caused by panel driving, a maintenance factor of emission in intensity (B=B1/B0×100) was used. The result of measurement is shown in FIG. 12. For comparison, similar measurement was performed for a BAM phosphor used commonly as a blue phosphor.

It was proved that the $(Ba_ySr_{1-y})_{3-x}MgSi_2O_8:Eu_x$ phosphor [$0 \leq x \leq 0.1$ or $0.65 \leq x \leq 1$] and [$0 \leq y \leq 0.1$ or $0.65 \leq y \leq 1$] had a higher maintenance factor of emission in intensity when the panel was driven and more excellent characteristics with reduced degradation than the BAM phosphor.

Although the invention achieved by the present inventors has been described specifically based on the embodiments thereof described above, the present invention is not limited to the foregoing embodiments. It is to be understood that various changes and modifications may be made in the present invention without departing from the spirit and scope thereof.

The present invention reduces decay times in a plasma display device and a luminescent device, improves the moving-image quality thereof, and implements an image display system having a longer lifetime and a high image quality.

What is claimed is:

1. A plasma display device comprising phosphor layer wherein the phosphor layer comprises blue-emission divalent europium activated alkaline earth silicate phosphor which is represented by the following compositional formula:

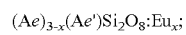

wherein x satisfies $0.01 \leq x \leq 0.1$, Ae is at least one alkaline earth element selected from the group consisting of Sr, Ca, and Ba, and Ae' is at least one element selected from the group consisting of Zn or (Zn plus Mg).

2. The plasma display according to claim 1, further comprising:
a pair of substrates opposite each other;
a discharge gas space formed between the pair of substrates to contain a gas sealed therein which generates a UV beam when it is discharged; and
electrodes formed on respective opposing surfaces of the pair of substrates,
wherein the phosphor layer is formed on the surface of one of the pair of substrates in contact with the discharge gas space.

3. The plasma display device according to claim 2;
wherein the phosphor layer comprises red phosphor layers comprising at least one phosphor selected from the group consisting of $(Y,Gd)BO_3$:Eu, $(Y,Gd)_2O_3$:Eu, and $(Y,Gd)(P,V)O_4$:Eu.

4. The plasma display device according to claim 2;
wherein the phosphor layer comprises green phosphor layers comprising at least one phosphor selected from the group consisting of $Zn_2SiO_4$:Mn, $(Y,Gd,Sc)_2SiO_5$:Tb, $(Y,Gd)_3(Al,Ga)_5O_{12}$:Tb, $(Y,Gd)_3(Al,Ga)_6O_{12}$:Ce, $(Y,Gd)B_3O_6$:Tb, and $(Y,Gd)PO_4$:Tb.

5. The plasma display device according to claim 3, wherein the phosphor layer comprises green phosphor layers comprising at least one phosphor selected from the group consisting of $Zn_2SiO_4$:Mn, $(Y,Gd,Sc)_2SiO_5$:Tb, $(Y,Gd)_3(Al,Ga)_5O_{12}$:Tb, $(Y,Gd)_3(Al,Ga)_5O_{12}$:Ce, $(Y,Gd)B_3O_6$:Tb, and $(Y,Gd)PO_4$:Tb.

6. A plasma display device comprising phosphor layer wherein the phosphor layer comprises blue-emission divalent europium activated alkaline earth silicate phosphor which is represented by the following compositional formula:

$(Sr_{1-y}Ba_y)_{3-x}(Ae')Si_2O_8$:$Eu_x$;

wherein x satisfies $0.01 \leq x \leq 0.1$, y satisfies $0 \leq y \leq 1$, and Ae' is at least one element selected from the group consisting of Zn or (Zn plus Mg).

7. The plasma display according to claim 6, further comprising:
a pair of substrates opposite each other;
a discharge gas space formed between the pair of substrates to contain a gas sealed therein which generates a UV beam when it is discharged; and
electrodes formed on respective opposing surfaces of the pair of substrates,
wherein the phosphor layer is formed on the surface of one of the pair of substrates in contact with the discharge gas space.

8. The plasma display device according to claim 7;
wherein the phosphor layer comprises red phosphor layers comprising at least one phosphor selected from the group consisting of $(Y,Gd)BO_3$:Eu, $(Y,Gd)_2O_3$:Eu, and $(Y,Gd)(P,V)O_4$:Eu.

9. The plasma display device according to claim 7;
wherein the phosphor layer comprises green phosphor layers comprising at least one phosphor selected from the group consisting of $Zn_2SiO_4$:Mn, $(Y,Gd,Sc)_2SiO_5$:Tb, $(Y,Gd)_3(Al,Ga)_5O_{12}$:Tb, $(Y,Gd)_3(Al,Ga)_5O_{12}$:Ce, $(Y,Gd)B_3O_6$:Tb, and $(Y,Gd)PO_4$:Tb.

10. The plasma display device according to claim 8, wherein the phosphor layers comprises green phosphor layers comprising at least one phosphor selected from the group consisting of $Zn_2SiO_4$:Mn, $(Y,Gd,Sc)_2SiO_5$:Tb, $(Y,Gd)_3(Al,Ga)_5O_{12}$:Tb, $(Y,Gd)_3(Al,Ga)_5O_{12}$:Ce, $(Y,Gd)B_3O_6$:Tb, and $(Y,Gd)PO_4$:Tb.

11. A plasma display device comprising phosphor layer wherein the phosphor layer comprises blue-emission divalent europium activated alkaline earth silicate phosphor which is represented by the following compositional formula:

$(Ae)_{1-c}(Mg_{0.9},Zn_{0.1})Si_2O_6$:$Eu_c$;

wherein Ae is at least one of an alkaline earth element selected from the group consisting of Sr, Ca and Ba, and c satisfies $0.01 \leq c \leq 0.3$.

12. The plasma display according to claim 11, further comprising:
a pair of substrates opposite each other;
a discharge gas space formed between the pair of substrates to contain a gas sealed therein which generates a UV beam when it is discharged; and
electrodes formed on respective opposing surfaces of the pair of substrates;
wherein the phosphor layer is formed on the surface of one of the pair of substrates in contact with the discharge gas space, and
wherein the phosphor layer comprises red phosphor layers comprising at least one phosphor selected from the group consisting at least one phosphor selected from the group consisting of $(Y,Gb)BO_3$:Eu, $(Y,Gd)_2O_3$:Eu, and $(Y,Gd)(P,V)O_4$:Eu.

13. The plasma display device according to claim 12, wherein the phosphor layer comprises green phosphor layers comprising at least one phosphor selected from the group consisting of $Zn_2SiO_4$:Mn, $(Y,Gd,Sc)_2SiO_5$:Tb, $(Y,Gd)_3(Al,Ga)_5O_{12}$:Tb, $(Y,Gd)_3(Al,Ga)_5O_{12}$:Ce, $(Y,Gd)B_3O_6$:Tb, and $(Y,Gd)PO_4$:Tb.

14. A plasma display device comprising phosphor layer wherein the phosphor layer comprises blue-emission divalent europium activated alkaline earth silicate phosphor which is represented by the following compositional formula:

$Ca0.9Eu0.01(Mg_{1-d},Zn_d)Si_2O_6$ wherein d satisfies $0.01 \leq d \leq 2$ or $d=1$.

15. The plasma display according to claim 14, further comprising:
a pair of substrates opposite each other;
a discharge gas space formed between the pair of substrates to contain a gas sealed therein which generates a UV beam when it is discharged; and
electrodes formed on respective opposing surfaces of the pair of substrates;
wherein the phosphor layer is formed on the surface of one of the pair of substrates in contact with the discharge gas space, and
wherein the phosphor layer comprises red phosphor layers comprising at least one phosphor selected from the group consisting of $(Y,Gd)BO_3$:Eu, $(Y,Gd)_2O_3$:Eu, and $(Y,Gd)(P,V)O_4$:Eu.

16. The plasma display device according to claim 15, wherein the phosphor layer comprises green phosphor layers consisting at least one phosphor selected from the group consisting of $Zn_2SiO_4$:Mn, $(Y,Gd,Sc)_2SiO_5$:Tb, $(Y,Gd)_3(Al,Ga)_5O_{12}$:Tb, $(Y,Gd)_3(Al,Ga)_5O_{12}$:Ce, $(Y,Gd)B_3O_6$:Tb, and $(Y,Gd)PO_4$:Tb.

* * * * *